United States Patent
Shigiya et al.

(10) Patent No.: US 11,303,829 B2
(45) Date of Patent: Apr. 12, 2022

(54) IMAGING DEVICE AND DRIVE METHOD OF IMAGING DEVICE

(71) Applicant: CANON KABUSHIKI KAISHA, Tokyo (JP)

(72) Inventors: Yoshiko Shigiya, Tokyo (JP); Noriyuki Shikina, Hachioji (JP); Shintaro Takenaka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/984,402

(22) Filed: Aug. 4, 2020

(65) Prior Publication Data

US 2021/0067717 A1    Mar. 4, 2021

(30) Foreign Application Priority Data

Aug. 28, 2019 (JP) .............................. JP2019-155804

(51) Int. Cl.
   *H04N 5/353* (2011.01)
   *H04N 5/341* (2011.01)
   *H04N 5/378* (2011.01)
   *H04N 5/355* (2011.01)

(52) U.S. Cl.
   CPC .......... *H04N 5/3532* (2013.01); *H04N 5/341* (2013.01); *H04N 5/35581* (2013.01); *H04N 5/378* (2013.01)

(58) Field of Classification Search
   CPC ...... H04N 5/3532; H04N 5/341; H04N 5/378; H04N 5/35581; H04N 5/347; H04N 5/345; H04N 5/3452; H04N 5/3454
   See application file for complete search history.

(56) References Cited

U.S. PATENT DOCUMENTS

| | | |
|---|---|---|
| 7,999,866 B2 | 8/2011 | Sonoda |
| 8,049,799 B2 | 11/2011 | Sonoda |
| 8,081,246 B2 | 12/2011 | Takenaka |
| 8,305,473 B2 | 11/2012 | Takenaka |
| 8,363,137 B2 | 1/2013 | Sonoda |
| 8,466,994 B2 | 6/2013 | Takenaka |
| 8,670,058 B2 | 3/2014 | Hayashi |

(Continued)

FOREIGN PATENT DOCUMENTS

| | | |
|---|---|---|
| JP | 2007-104241 | 4/2007 |
| JP | 4819528 | 11/2011 |

(Continued)

OTHER PUBLICATIONS

U.S. Appl. No. 16/944,222, filed Jul. 31, 2020 by Noriyuki Shikina et al.

*Primary Examiner* — Nhan T Tran
(74) *Attorney, Agent, or Firm* — Venable LLP

(57) ABSTRACT

Provided is an imaging device including a scanning unit configured to control a plurality of pixels so as to perform a shutter scan and a readout scan, and the scanning unit is further configured to switch a drive mode between a first drive mode and a second drive mode having periods of different lengths of the readout scan in control of the plurality of pixels and start the shutter scan performed in the second drive mode before the readout scan performed in the first drive mode ends when switching a drive mode from the first drive mode to the second drive mode.

18 Claims, 16 Drawing Sheets

(56) References Cited

U.S. PATENT DOCUMENTS

| | | | |
|---|---|---|---|
| 8,780,245 B2* | 7/2014 | Nakaseko | H04N 5/378 |
| | | | 348/296 |
| 9,654,697 B2 | 5/2017 | Takenaka | |
| 9,843,752 B2 | 12/2017 | Yamamoto | |
| 10,277,839 B2 | 4/2019 | Takenaka | |
| 10,389,964 B2 | 8/2019 | Taniguchi | |
| 10,547,794 B2 | 1/2020 | Takenaka | |
| 10,645,316 B2 | 5/2020 | Shigiya | |
| 10,659,713 B2 | 5/2020 | Shikina | |
| 2007/0085921 A1* | 4/2007 | Kitagata | H04N 5/23245 |
| | | | 348/308 |
| 2008/0002038 A1* | 1/2008 | Suwa | H04N 5/2352 |
| | | | 348/229.1 |
| 2009/0180014 A1* | 7/2009 | Noda | H04N 5/3532 |
| | | | 348/308 |
| 2011/0007173 A1* | 1/2011 | Takenaka | H04N 5/3532 |
| | | | 348/222.1 |
| 2011/0267513 A1 | 11/2011 | Sonoda | |
| 2012/0013778 A1 | 1/2012 | Sonoda | |
| 2014/0218575 A1 | 8/2014 | Yanai | |
| 2014/0240563 A1 | 8/2014 | Nakaseko | |
| 2015/0129744 A1 | 5/2015 | Sonoda | |
| 2015/0341580 A1* | 11/2015 | Yamazaki | H04N 5/378 |
| | | | 348/297 |
| 2016/0073016 A1 | 3/2016 | Ohya | |
| 2019/0191112 A1* | 6/2019 | Shigiya | H04N 5/3532 |
| 2019/0215469 A1 | 7/2019 | Takenaka | |
| 2020/0154067 A1 | 5/2020 | Igarashi | |
| 2020/0204747 A1* | 6/2020 | Park | H04N 5/347 |

FOREIGN PATENT DOCUMENTS

| | | |
|---|---|---|
| JP | 2015-76852 | 4/2015 |
| JP | 2017-200056 | 11/2017 |

* cited by examiner

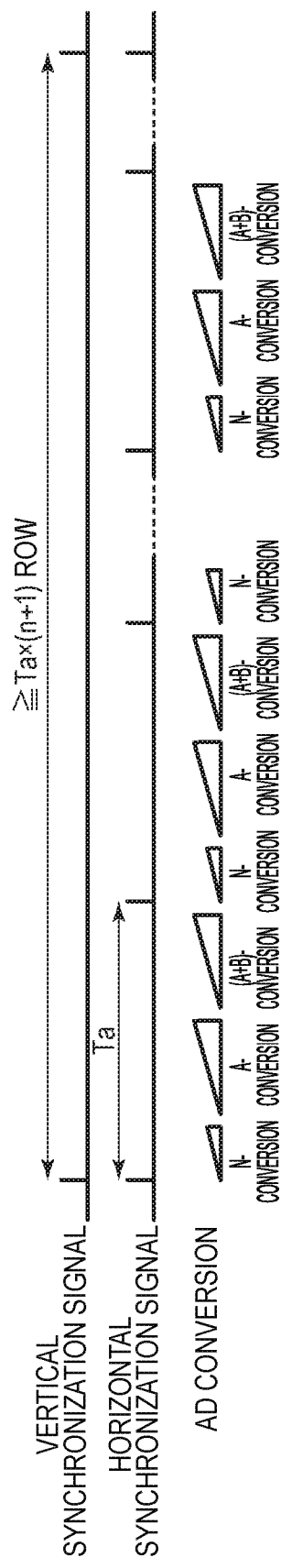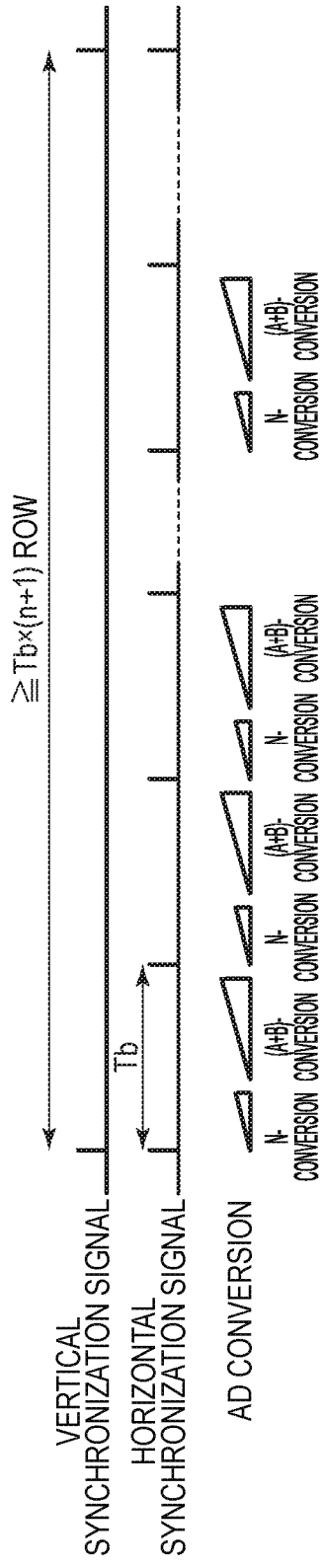

IMAGING DEVICE AND DRIVE METHOD OF IMAGING DEVICE

BACKGROUND OF THE INVENTION

Field of the Invention

The present invention relates to an imaging device and a drive method of the imaging device.

Description of the Related Art

In imaging devices such as CMOS image sensors, some imaging devices continuously acquire a plurality of images for capturing a moving image or the like. Some of such imaging devices can change a drive mode related to a shutter operation, a readout operation, or the like while continuously acquiring a plurality of images.

Japanese Patent Application Laid-Open No. 2007-104241 discloses an imaging device that can switch drive modes on a frame basis. When switching the drive mode from a first drive mode to a second drive mode, the imaging device of Japanese Patent Application Laid-Open No. 2007-104241 switches the drive mode of the shutter operation to the second drive mode while maintaining the drive mode of the readout operation in the first drive mode during a period corresponding to one frame. Furthermore, the imaging device of Japanese Patent Application Laid-Open No. 2007-104241 performs a readout scan at the same scanning rate regardless of the drive mode so that the scanning rate does not change when the drive mode is switched. Accordingly, it is possible to maintain an even charge accumulation period in photoelectric conversion elements on each row when the drive mode is switched and prevent output of ineffective data.

In the switching scheme of the drive mode disclosed in Japanese Patent Application Laid-Open No. 2007-104241, since the cycle of readout operations is constant regardless of drive modes, there is no consideration on a case where readout periods are different between drive modes.

SUMMARY OF THE INVENTION

Accordingly, the present invention intends to provide an imaging device and a drive method of the imaging device that enable switching to a drive mode with a different readout period when continuously acquiring a plurality of images.

According to one aspect of the present invention, provided is an imaging device including: a plurality of pixels arranged over a plurality of rows, each of the plurality of pixels including a photoelectric conversion unit configured to generate and accumulate charges by photoelectric conversion, a detection unit to which charges are transferred from the photoelectric conversion unit, an amplifier unit that is connected to the detection unit and configured to output a pixel signal in accordance with a potential of the detection unit, and a reset unit configured to reset charges accumulated in the photoelectric conversion unit; a scanning unit configured to control the plurality of pixels so as to perform a shutter scan to start accumulation of charges in the photoelectric conversion unit by releasing reset of the photoelectric conversion unit for each of the rows and perform a readout scan to output the pixel signal from the amplifier unit to a signal line for each of the rows; and a control unit configured to output, to the scanning unit, a first synchronization signal indicating a drive timing of pixels on respective rows in the shutter scan and a second synchronization signal indicating a drive timing of pixels on respective rows in the readout scan. The scanning unit is further configured to switch a drive mode between a first drive mode and a second drive mode having periods of different lengths of the readout scan in control of the plurality of pixels based on the first synchronization signal and the second synchronization signal, and start the shutter scan performed in the second drive mode before the readout scan performed in the first drive mode ends when switching a drive mode from the first drive mode to the second drive mode.

According to another aspect of the present invention, provided is a drive method of an imaging device having a plurality of pixels arranged over a plurality of rows, each of the plurality of pixels including a photoelectric conversion unit configured to generate and accumulate charges by photoelectric conversion, a detection unit to which charges are transferred from the photoelectric conversion unit, an amplifier unit that is connected to the detection unit and configured to output a pixel signal in accordance with a potential of the detection unit, and a reset unit configured to reset charges accumulated in the photoelectric conversion unit, a scanning unit configured to control the plurality of pixels so as to perform a shutter scan to start accumulation of charges in the photoelectric conversion unit by releasing reset of the photoelectric conversion unit for each of the rows and perform a readout scan to output the pixel signal from the amplifier unit to a signal line for each of the rows, and a control unit configured to output, to the scanning unit, a first synchronization signal indicating a drive timing of pixels on respective rows in the shutter scan and a second synchronization signal indicating a drive timing of pixels on respective rows in the readout scan, the drive method comprising: controlling the plurality of pixels by using a first drive mode based on the first synchronization signal and the second synchronization signal; based on the first synchronization signal and the second synchronization signal, controlling the plurality of pixels by using a second drive mode that is different from the first drive mode in a length of a period of the readout scan; and starting the shutter scan performed in the second drive mode before the readout scan performed in the first drive mode ends.

Further features of the present invention will become apparent from the following description of exemplary embodiments with reference to the attached drawings.

BRIEF DESCRIPTION OF THE DRAWINGS

FIG. 14A and FIG. 14B are diagrams schematically illustrating the time required for a readout operation of the imaging device according to the fourth embodiment.

DESCRIPTION OF THE EMBODIMENTS

Preferred embodiments of the present invention will now be described in detail in accordance with the accompanying drawings.

First Embodiment

Figure 1:
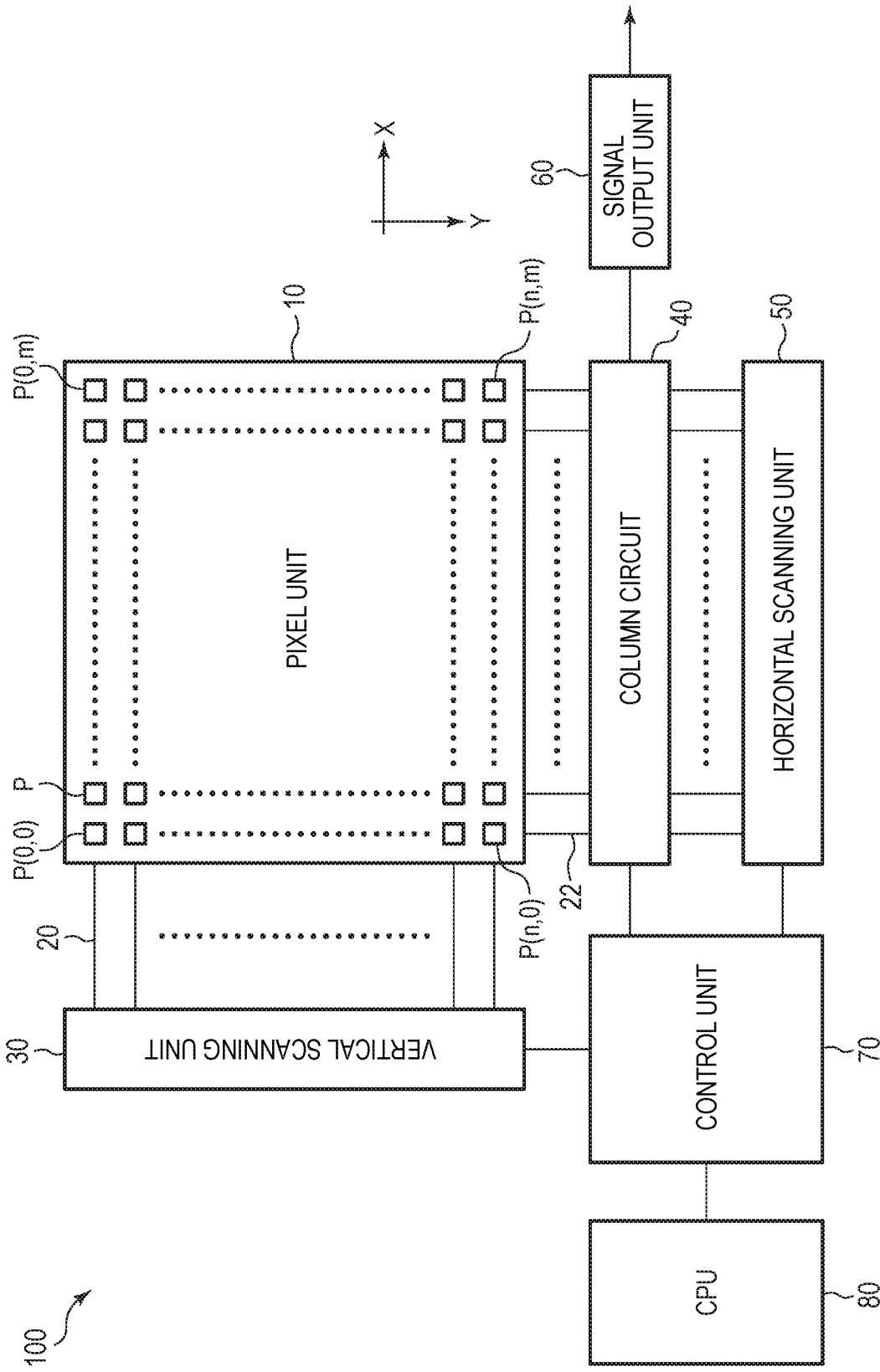
FIG. 1 is a block diagram illustrating a general configuration of an imaging device according to a first embodiment.

FIG. 1 is a block diagram illustrating a general configuration of an imaging device 100 according to the present embodiment. The imaging device 100 has a pixel unit 10, a vertical scanning unit 30, a column circuit 40, a horizontal scanning unit 50, a signal output unit 60, a control unit 70, and a CPU 80.

In the pixel unit 10, a plurality of pixels P arranged over a plurality of rows and a plurality of columns are arranged. FIG. 1 illustrates the pixel P(0,0) to the pixel P(n, m) arranged two-dimensionally with (n+1) rows by (m+1) columns. Herein, in denotation of a pixel P(X, Y), X denotes a row number, and Y denotes a column number. The row number of the leading row is 0-th row, and the column number of the leading column is 0-th column. Note that, in the present specification, when a pixel P arranged at a particular position in the pixel unit 10 is illustrated, the pixel P is denoted with the row number and the column number such as "pixel P(n, m)", and when the position in the pixel unit 10 is not specified, the pixel P is simply denoted as "pixel P".

On each row of the pixel unit 10, a control line 20 is arranged extending in a first direction (the X direction in FIG. 1). The control line 20 is connected to the pixels P arranged in the first direction, respectively, to form a signal line common to these pixels P. In the present specification, the first direction in which the control line 20 extends may be expressed as a row direction.

Further, on each column of the pixel unit 10, an output line 22 is arranged extending in a second direction (the Y direction in FIG. 1) crossing the first direction. The output line 22 is connected to the pixels P arranged in the second direction, respectively, to form a signal line common to these pixels P. In the present specification, the second direction in which the output line 22 extends may be expressed as a column direction.

The control line 20 on each row is connected to the vertical scanning unit 30. Further, the output line 22 on each column is connected to the column circuit 40. The horizontal scanning unit 50 and the signal output unit 60 are connected to the column circuit 40. The control unit 70 is connected to the vertical scanning unit 30, the column circuit 40, and the horizontal scanning unit 50. The CPU 80 is connected to the control unit 70.

The vertical scanning unit 30 is a circuit unit that supplies control signals used for driving readout circuits in the pixels P to the pixels P via the control lines 20. The vertical scanning unit 30 operates in response to a signal from the control unit 70 and performs a shutter scan and a readout scan of the pixel unit 10. Note that the shutter scan refers to an operation to perform resetting and releasing of reset of photoelectric conversion elements on the pixels P on some or all of the rows in the pixel unit 10 sequentially on a row basis and start exposure (accumulation of charges). The readout scan refers to an operation to cause the pixels P on some or all of the rows in the pixel unit 10 to output pixel signals based on charges accumulated in photoelectric conversion elements sequentially on a row basis.

The column circuit 40 has an amplifier circuit, an analog to digital converter (AD conversion) circuit, a memory unit, or the like. The column circuit 40 amplifies pixel signals output from the pixels P, performs AD conversion thereon, and holds the converted signals in a memory unit as digital pixel signals.

The horizontal scanning unit 50 operates in response to receiving a signal from the control unit 70 and sequentially outputs control signals to a memory unit on each column of the column circuit 40. The column circuit 40 that has received control signals from the horizontal scanning unit 50 outputs digital pixel signals held in the memory unit on a corresponding column to the signal output unit 60.

The signal output unit 60 has an external interface such as a digital signal processing unit, a parallel to serial converter circuit, a low voltage differential signaling (LVDS) circuit, or the like. The signal output unit 60 implements digital signal processing on a digital pixel signal received from the column circuit 40 and outputs the processed signal to the outside of the imaging device 100 as serial data.

The control unit 70 is a circuit unit that supplies, to the vertical scanning unit 30, the column circuit 40, the horizontal scanning unit 50, and the like, control signals used for controlling the operation thereof or the timing thereof. At least some of these control signals may be supplied from the outside of the imaging device 100.

The CPU 80 controls the control unit 70. The control unit 70 operates in response to receiving a control signal such as a synchronization signal or a setting signal for an operation mode or the like from the CPU 80. The CPU 80 may be provided inside an imaging system on which the imaging device 100 is mounted, that is, the outside of the imaging device 100.

Note that the column circuit 40 is not necessarily required to have an AD conversion function and may perform AD conversion outside the imaging device 100, for example. In such a case, the configuration of the horizontal scanning unit 50 and the signal output unit 60 may be changed as appropriate so as to be adapted for processing of analog signals.

Figure 2:
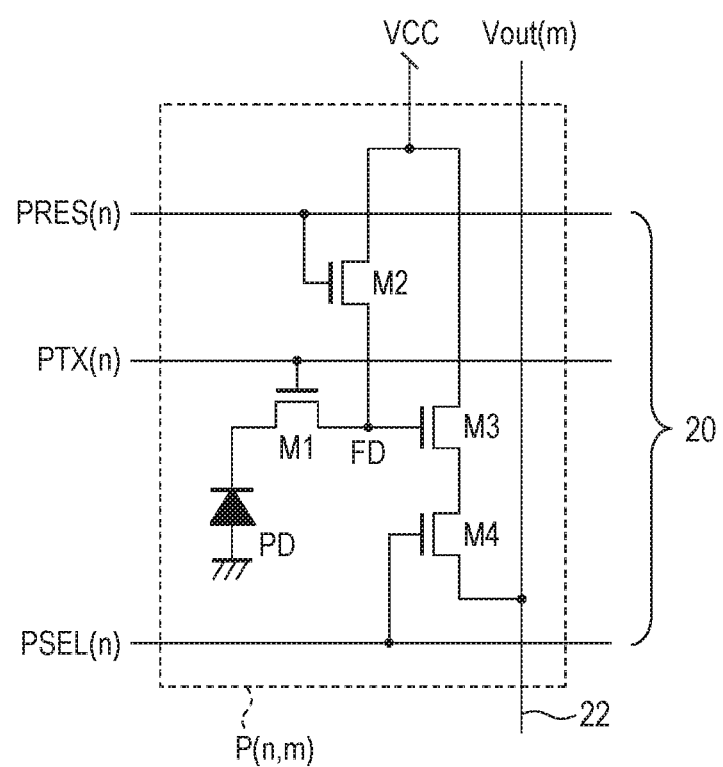
FIG. 2 is a circuit diagram illustrating a configuration example of a pixel in the imaging device according to the first embodiment.

FIG. 2 is a circuit diagram illustrating a configuration example of the pixel P according to the present embodiment. The circuit illustrated in FIG. 2 has a typical pixel configuration used for imaging devices to which rolling shutter driving is applied. Each of the plurality of pixels P forming the pixel unit 10 includes a photoelectric conversion unit PD, a transfer transistor M1, an FD reset transistor M2, an amplifier transistor M3, and a select transistor M4. Note that, although FIG. 2 illustrates a pixel P(n, m) arranged on the n-th row and the m-th column as an example, the same applies to other pixels P.

The photoelectric conversion unit PD is a photoelectric conversion element, for example, a photodiode. The anode of the photodiode forming the photoelectric conversion unit PD is connected to the ground node, and the cathode is connected to the source of the transfer transistor M1. The drain of the transfer transistor M1 is connected to the source of the FD reset transistor M2 and the gate of the amplifier transistor M3. The connection node of the drain of the transfer transistor M1, the source of the FD reset transistor M2, and the gate of the amplifier transistor M3 is a so-called floating diffusion FD. The floating diffusion FD includes a capacitance component, functions as a charge holding portion, and forms a charge-to-voltage conversion unit formed of this capacitance component. The drain of the FD reset transistor M2 and the drain of the amplifier transistor M3 are connected to a power source node (voltage VCC). The source of the amplifier transistor M3 is connected to the drain of the select transistor M4. The source of the select transistor M4 is connected to the output line 22. A current source (not illustrated) is connected to the output line 22. Note that the names of a source and a drain of a transistor may be different in accordance with the conductivity type or a function to be focused on of the transistor, and names opposite to the source and the drain described above may be used.

In the case of the circuit configuration illustrated in FIG. 2, the control line 20 on each row includes a transfer gate signal line, an FD reset signal line, and a select signal line.

The transfer gate signal line is connected to the gates of the transfer transistors M1 of the pixels P belonging to a corresponding row and supplies, to the gates of the transfer transistors M1, a control signal PTX supplied from the vertical scanning unit 30. For example, a control signal PTX(n) is supplied to the pixel P(n, m) via the transfer gate signal line on the n-th row.

The FD reset signal line is connected to the gates of the FD reset transistors M2 of the pixels P belonging to a corresponding row and supplies, to the gates of the FD reset transistors M2, a control signal PRES supplied from the vertical scanning unit 30. For example, a control signal PRES(n) is supplied to the pixel P(n, m) via the FD reset signal line on the n-th row.

The select signal line is connected to the gates of the select transistors M4 of the pixels P belonging to a corresponding row and supplies, to the gates of the select transistors M4, a control signal PSEL supplied from the vertical scanning unit 30. For example, a control signal PSEL(n) is supplied to the pixel P(n, m) via the select signal line on the n-th row.

When each transistor of the pixel P is formed of an N-channel transistor, a corresponding transistor is turned on when a high-level control signal is supplied from the vertical scanning unit 30, and the corresponding transistor is turned off when a low-level control signal is supplied from the vertical scanning unit 30. Herein, the high level corresponds to a logic value "1", and the low level corresponds to a logic value "0". Note that each transistor of the pixel P may be formed of a P-channel transistor. When each transistor of the pixel P is formed of a P-channel transistor, the signal level of the control signal used for driving each transistor is opposite to the case of the N-channel transistor.

In response to an optical image of an object entering the pixel unit 10, the photoelectric conversion unit PD of each pixel P converts (photoelectrically converts) the incident light into an amount of charges in accordance with the light amount and accumulates the generated charges. When turned on, the transfer transistor M1 transfers charges accumulated in the photoelectric conversion unit PD to the floating diffusion FD.

The floating diffusion FD is a detection unit that holds charges transferred from the photoelectric conversion unit PD and detects charges indicating a voltage in accordance with the amount of charges transferred from the photoelectric conversion unit PD by charge-to-voltage conversion caused by the capacitance component of the floating diffusion FD. The amplifier transistor M3 is configured such that the voltage VCC is supplied to the drain and a bias current is supplied to the source via the select transistor M4. The amplifier transistor M3 forms an amplifier unit whose input node is the gate connected to the floating diffusion FD. In such a way, the amplifier transistor M3 forms a source follower circuit. Accordingly, the amplifier transistor M3 outputs a pixel signal (a pixel signal Vout(m) at the pixel P on the m-th column) based on the voltage of the floating diffusion FD to the output line 22 via the select transistor M4.

When turned on, the FD reset transistor M2 resets the floating diffusion FD to a voltage in accordance with the voltage VCC. Further, when the FD reset transistor M2 and the transfer transistor M1 are turned on at the same time, the photoelectric conversion unit PD can be reset to a voltage in accordance with the voltage VCC. The FD reset transistor M2 and the transfer transistor M1 form a reset unit that resets the photoelectric conversion unit PD.

Figure 3:
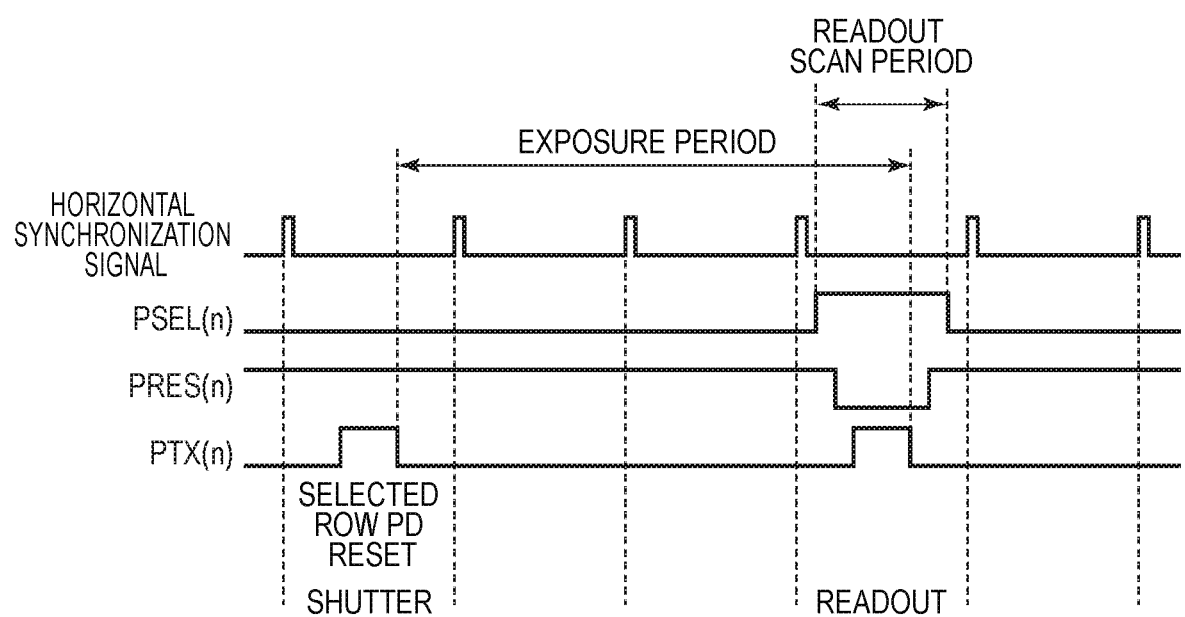
FIG. 3 is a timing chart illustrating a drive method of the imaging device according to the first embodiment.

FIG. 3 is a timing chart illustrating a drive method of the imaging device 100 according to the present embodiment. FIG. 3 illustrates an outline of a shutter operation and a readout operation on each row of the pixel unit 10. Note that FIG. 3 illustrates only the operation on the n-th row as an example.

In the shutter operation, the control signals PRES(n) and PTX(n) are controlled to the high level, and the transfer transistor M1 and the FD reset transistor M2 are turned on at the same time. Thereby, the photoelectric conversion unit PD is connected to the power source node via the transfer transistor M1 and the FD reset transistor M2, and the photoelectric conversion unit PD is reset to a potential in accordance with the voltage VCC. Then, a timing to control the control signal PTX(n) to the low level to release the reset of the photoelectric conversion unit PD is the start of an accumulation period of charges in the photoelectric conversion unit PD, that is, the time of exposure start.

In the readout operation, the control signal PRES(n) is controlled to the low level, the control signals PSEL(n) and PTX(n) are controlled to the high level, and the transfer transistor M1 and the select transistor M4 are turned on at the same time with the FD reset transistor M2 being in the off-state. Thereby, charges accumulated in the photoelectric conversion unit PD are transferred to the floating diffusion FD. Then, a timing to control the control signal PTX(n) to the low level to end the transfer of charges to the floating diffusion FD is the end of an accumulation period of charges in the photoelectric conversion unit PD, that is, the time of exposure end.

In response to charges being transferred from the photoelectric conversion unit PD to the floating diffusion FD, the floating diffusion FD is at a potential in accordance with the amount of the transferred charges. Thereby, the amplifier transistor M3 outputs a pixel signal in accordance with the potential of the floating diffusion FD to the output line 22 via the select transistor M4. In such a way, the readout operation is an operation that includes charge transfer to transfer charges generated by the photoelectric conversion unit PD to the floating diffusion FD and performs readout of a pixel signal based on the charges generated by the photoelectric conversion unit PD. In such a way, rows of the pixel unit 10 are sequentially selected to perform one-row pixel driving, and thereby a shutter scan and a readout scan in accordance with rolling shutter driving are performed.

The start time of a period of a readout scan on the n-th row is the time when output of signals on the n-th row to the output line 22 starts. Further, the end time of a period of a readout scan is the time when output of signals on the n-th row to the output line 22 ends. In a readout scan on the n-th row, multiple times of output of signals to the output line 22 may be performed. In such a case, the start time of a period of a readout scan is the time when output of signals on the n-th row to the output line 22 starts for the first time. Further, the end time of a period of a readout scan is the time when the output of signals on the n-th row to the output line 22 ends for the last time.

When the pixel P has a circuit configuration having the select transistor M4, as illustrated in FIG. 3, the start time of a period of a readout scan on the n-th row in one frame of readout is the time when the control signal PSEL(n) rises. Further, the end time of a period of a readout scan on the n-th row is the time when the control signal PSEL(n) falls. That is, the length of a period of a readout scan on the n-th row corresponds to the period from the start time to the end time described above. The control signal PSEL(n) may rise and fall for multiple times in a readout scan of one row. In such a case, the start time of a period of a readout scan on the n-th row is the time when the control signal PSEL(n) rises for the first time, and the end time of a period of a readout scan on the n-th row is the time when the control signal PSEL(n) falls for the last time.

When the pixel P has a circuit configuration having no select transistor M4, that is, when the source of the amplifier transistor M3 is directly connected to the output line 22 in FIG. 2, the control signal PSEL(n) is not used. In such a case, the start and the end of output of signals on the n-th row to the output line 22 are defined by a timing of turning ON/OFF of the amplifier transistor M3 in accordance with control of the potential of the drain of the amplifier transistor M3 or control of the potential of the gate of the amplifier transistor M3.

Figure 5:
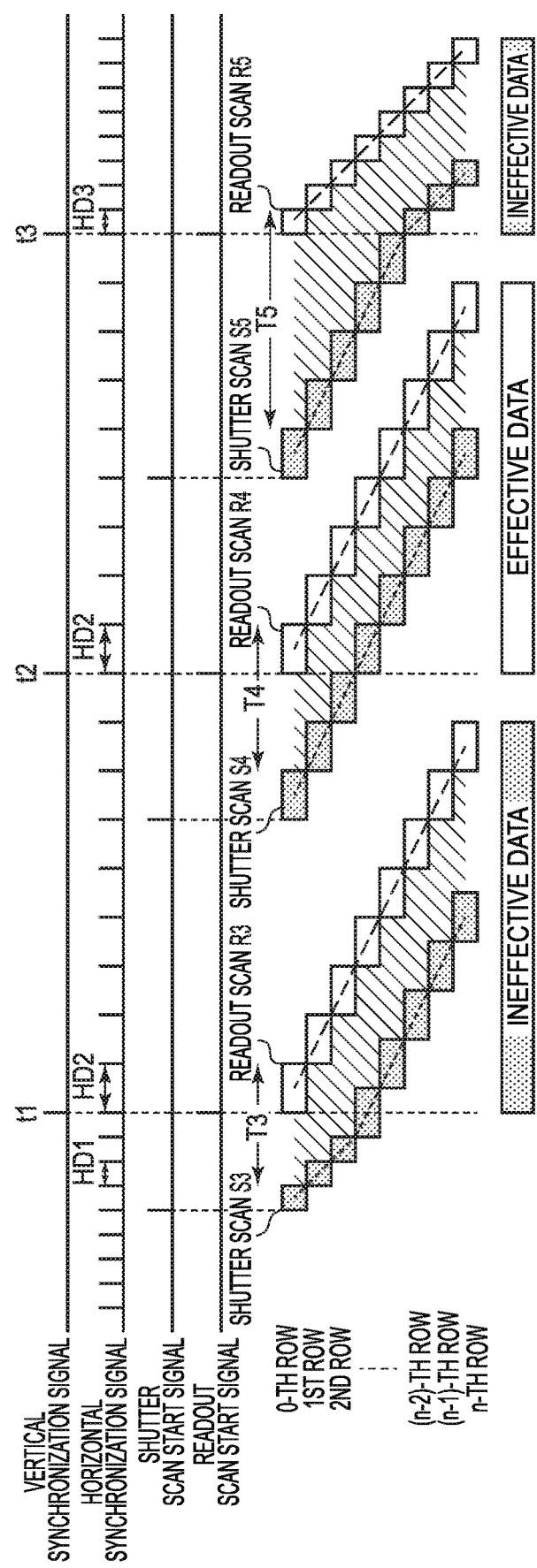
FIG. 5 is a timing chart illustrating a drive method of an imaging device according to a second comparative example.
Figure 6:
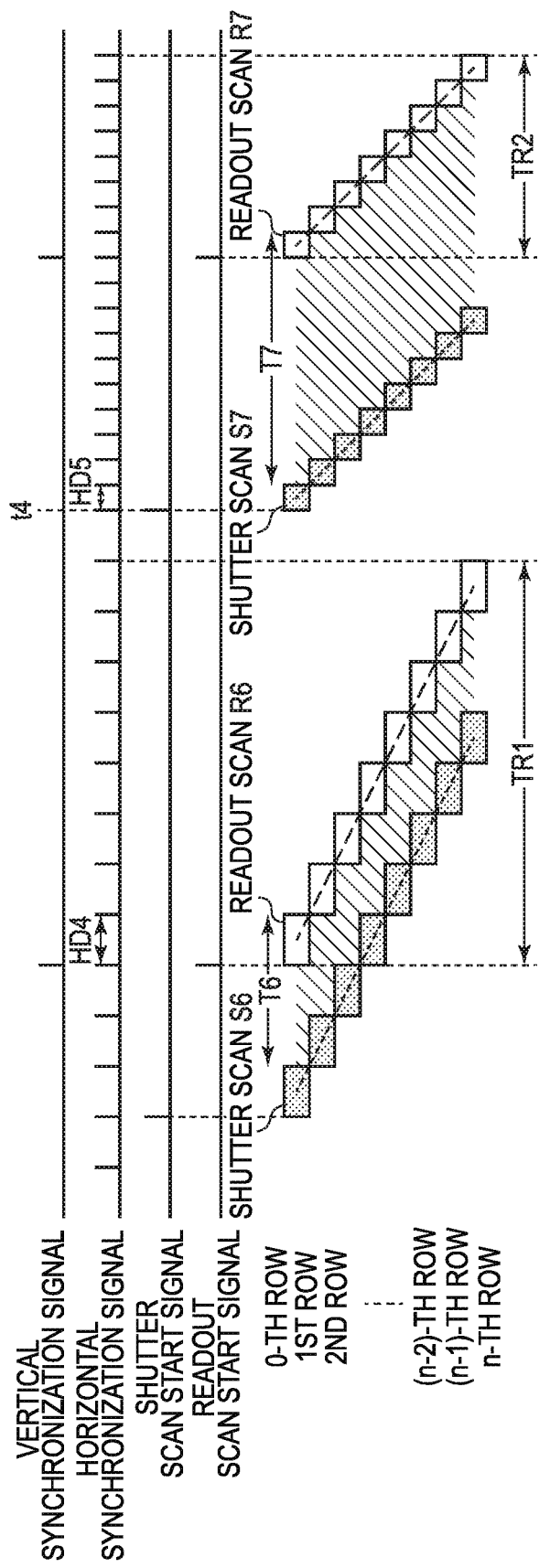
FIG. 6 is a timing chart illustrating a drive method of an imaging device according to a third comparative example.

Next, drive methods of imaging devices 100 according to a first comparative example, a second comparative example, and a third comparative example will be described with reference to FIG. 4, FIG. 5, and FIG. 6, respectively, and a drive method of the imaging device 100 according to the present embodiment will then be described with reference to FIG. 7. Herein, each of the imaging devices 100 of the first to third comparative examples and the present embodiment has the configuration illustrated in FIG. 1 to FIG. 3. That is, the difference between the first comparative example, the second comparative example, the third comparative example, and the present embodiment is in the drive method of the imaging device 100. Note that, in the description of these comparative examples and the present embodiment, duplicated description may be omitted or simplified.

First, the drive method of the imaging device 100 according to the first comparative example illustrated in FIG. 4 will be described. FIG. 4 illustrates an example of driving in which data for one row is read out every time the horizontal synchronization signal is input. The upper part in FIG. 4 illustrates timings of a vertical synchronization signal, a horizontal synchronization signal, a shutter scan start signal, and a readout scan start signal.

The shutter scan start signal and the readout scan start signal are control signals output from the control unit 70 to the vertical scanning unit 30 at predetermined timings. The shutter scan start signal is a signal that instructs the vertical scanning unit 30 to start a shutter scan. The readout scan start signal is a signal that instructs the vertical scanning unit 30 to start a readout scan.

Figure 4:
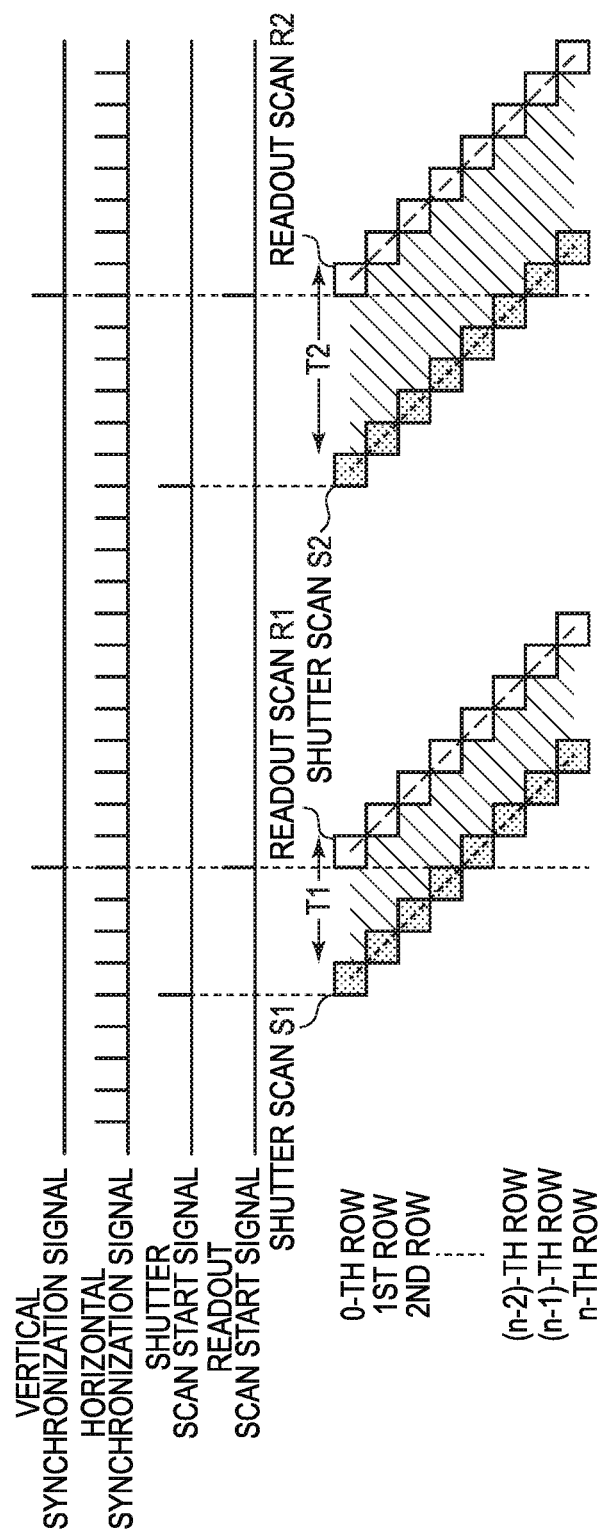
FIG. 4 is a timing chart illustrating a drive method of an imaging device according to a first comparative example.

The lower part in FIG. 4 illustrates an outline of the operation corresponding to the signals indicated in the upper part. Each of rectangular block groups denoted as "SHUTTER SCAN S1, S2" and "READOUT SCAN R1, R2" corresponds to "shutter operation" and "readout operation" described in FIG. 3. That is, the lower part in FIG. 4 visually represents that the operation in which shutter operations of respective rows are performed sequentially on a row basis is a shutter scan and that the operation in which readout operations of respective rows are performed sequentially on a row basis is a readout scan.

The shutter scan is started in response to the vertical scanning unit 30 receiving a control pulse of the shutter scan start signal. Further, the readout scan is started in response to the vertical scanning unit 30 receiving a control pulse of the readout scan start signal. The end time of a shutter scan is a time earlier by an accumulation period than the end time of a readout scan. In the example of driving of FIG. 4, a readout operation for one row is performed during one horizontal period defined by an interval of control pulses of the horizontal synchronization signal (by the cycle of the horizontal synchronization signal), and a readout operation for the next row is performed during the next one horizontal period. Further, a shutter operation for one row is performed during one horizontal period, and a shutter operation for the next row is performed during the next one horizontal period. In such a way, a shutter operation and a readout operation are performed sequentially on a row basis, and thereby a shutter scan and a readout scan are performed.

In the drive method of this comparative example, a first drive mode and a second drive mode with different accumulation periods can be switched. In FIG. 4, the shutter scan S1 and the readout scan R1 correspond to the first drive mode, and the shutter scan S2 and the readout scan R2 correspond to the second drive mode. The first drive mode and the second drive mode are different from each other in the interval between the shutter scan and the readout scan. Accordingly, the accumulation period T1 in the first drive mode and the accumulation period T2 in the second drive mode are different from each other. Note that, although a timing of switching from the first drive mode to the second drive mode is typically the start time of the shutter scan S2, the timing may be between the end time of the readout scan R1 and the start time of the shutter scan S2. In this example, the time interval between the shutter operation and the readout operation on each row is constant. Thus, since the accumulation periods are even on all the rows, effective data can be obtained.

Next, the drive method of the imaging device 100 according to the second comparative example illustrated in FIG. 5 will be described. This comparative example is an example in which the cycle of the horizontal synchronization signal is changed when the drive mode is changed. An example of the case of changing the cycle of the horizontal synchronization signal may be a case where the readout period in one horizontal period is changed due to a change of the drive mode. FIG. 5 illustrates an example in which the cycle of the horizontal synchronization signal is changed from HD1 to HD2 at time t1 and the cycle of the horizontal synchronization signal is changed from HD2 to HD3 at time t3. Herein, HD1, HD2, and HD3 satisfy a relationship of HD2>HD1 and HD2>HD3. Note that the cycle of the horizontal synchronization signal is not changed at time t2.

The readout scan R3 is started from time t1. The shutter scan S3 corresponding to the readout scan R3 is started before time t1 so that the accumulation period is T3. If time t1 occurs during the shutter scan S3, the cycle of the horizontal synchronization signal changes from HD1 to HD2, and thereby the slope of the shutter scan S3 changes as illustrated in FIG. 5. Due to such a change of the slope, the accumulation periods are not even on all the rows. Thus, data read out by the readout scan R3 is ineffective data.

The readout scan R4 is started from time t2. The shutter scan S4 corresponding to the readout scan R4 is started before time t2 so that the accumulation period is T4. When time t2 occurs during the shutter scan S4, the cycle of the horizontal synchronization signal does not change at HD2. Since the slope of the shutter scan S4 is constant, the accumulation periods are even on all the rows. Thus, data read out by the readout scan R4 is effective data.

In the readout scan R5 started from time t3 and the shutter scan S5 corresponding thereto, the accumulation periods are not even on all the rows in the same manner as the case of the shutter scan S3 and the readout scan R3. Thus, data read out by the readout scan R5 is also ineffective data. If the cycle of the horizontal synchronization signal is changed during a shutter scan as with the second comparative example, the slope of the shutter scan changes. Due to such a change of the slope, data read out immediately after the cycle is changed may be ineffective data.

Next, the drive method of the imaging device 100 according to the third comparative example illustrated in FIG. 6 will be described. This comparative example is an example of a scheme to prevent occurrence of ineffective data when the cycle of the horizontal synchronization signal is changed in the same manner as the second comparative example. FIG. 6 illustrates an example in which the cycle of the horizontal synchronization signal is changed from HD4 to HD5 in order to change the readout period from TR1 to TR2 at time t4. Herein, HD4 and HD5 satisfy a relationship of HD4>HD5.

In this comparative example, unlike the second comparative example, the cycle of the horizontal synchronization signal is changed from HD4 to HD5 at time t4 after the readout scan R6 ends, and the shutter scan S7 starts. That is, in this comparative example, the cycle of the horizontal synchronization signal is not changed during the shutter scan S7. Accordingly, since the slope of the shutter scan S7 is constant, the accumulation periods are even on all the rows. Thus, data read out by the readout scan R7 is effective data.

As described above, in this comparative example, data read out immediately after the cycle of the horizontal synchronization signal is changed is also effective data. In this comparative example, however, the start of the shutter scan S7 is delayed for waiting for the end of the readout scan R6 and then starting the shutter scan S7 so that the readout scan R6 and the shutter scan S7 do not overlap. Thus, there may be problems of a delay of start of the readout scan R7 and a reduction of the accumulation period T7.

Next, the drive method of the imaging device according to the present embodiment illustrated in FIG. 7 will be described. In the drive method of the present embodiment, a shutter horizontal synchronization signal and a readout horizontal synchronization signal whose cycles can be set individually are used. The shutter horizontal synchronization signal and the readout horizontal synchronization signal are generated by the control unit 70 based on the horizontal synchronization signal. The shutter horizontal synchronization signal is a first synchronization signal indicating a drive timing of the pixels P on each row in a shutter scan. The readout horizontal synchronization signal is a second synchronization signal indicating a drive timing of the pixels P on each row in a readout scan.

Figure 7:
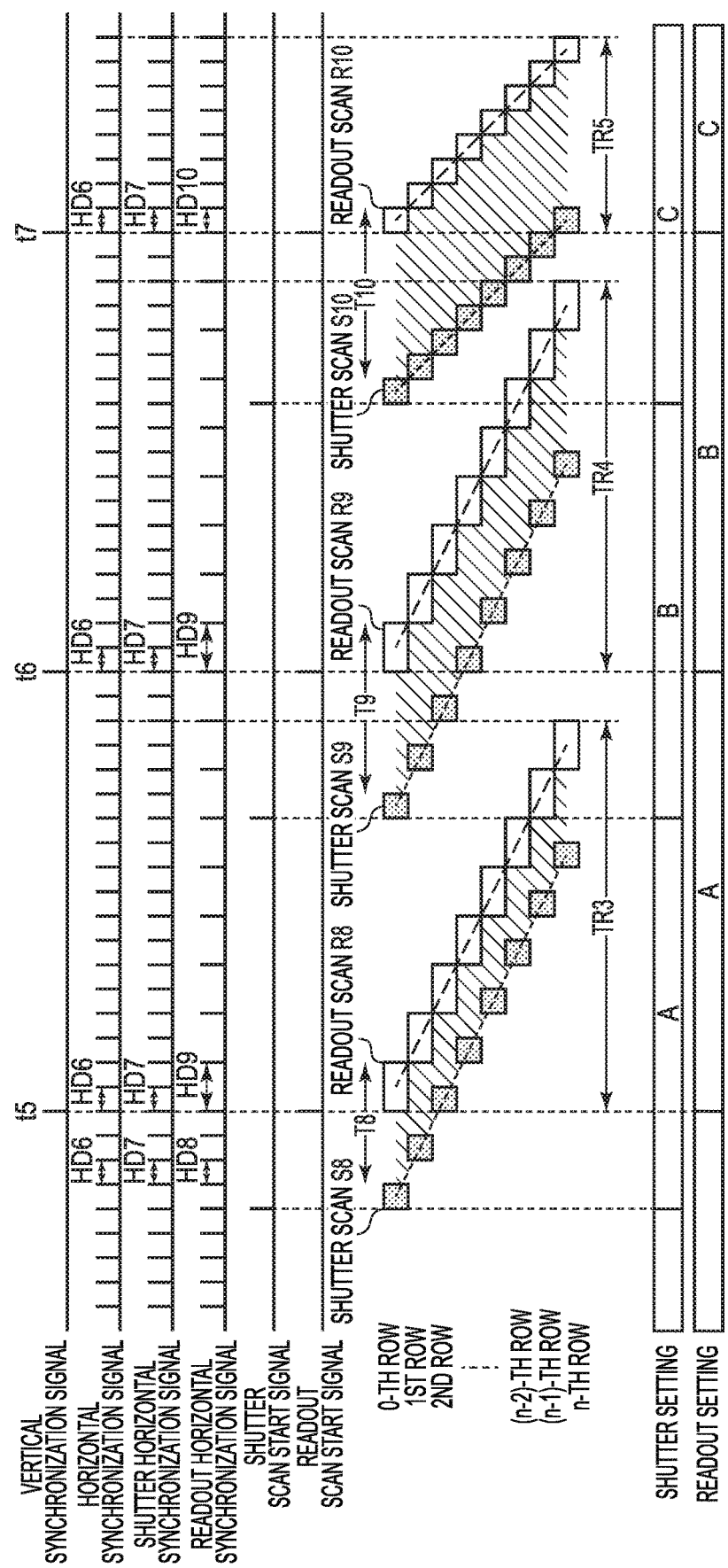
FIG. 7 is a timing chart illustrating a drive method of the imaging device according to the first embodiment.

A shutter setting (A, B, C) and a readout setting (A, B, C) illustrated in FIG. 7 are updated at a timing based on the shutter scan start signal and a readout scan start signal. Herein, the shutter setting and the readout setting may be, specifically, a setting of a cycle of one horizontal period required for readout, a readout mode represented by an addition mode of a vertical scan, a readout region, or the like.

Also in the present embodiment, the first drive mode and the second drive mode of different accumulation periods can be switched in a similar manner to the first to third comparative examples. In FIG. 7, for example, the shutter scan S8 and the readout scan R8 correspond to the first drive mode, and the shutter scan S9 and the readout scan R9 correspond to the second drive mode. Alternatively, the shutter scan S9 and the readout scan R9 may correspond to the first drive mode, and the shutter scan S10 and the readout scan R10 may correspond to the second drive mode. The interval between a shutter scan and a readout scan (accumulation periods T8, T9, T10) is different between the first drive mode and the second drive mode. Further, the length of the period of a readout scan (TR3, TR4, TR5) is different between the first drive mode and the second drive mode.

FIG. 7 illustrates an example in which the cycle of the readout horizontal synchronization signal is changed from HD8 to HD9 at time t5 and the cycle of the readout horizontal synchronization signal is changed from HD9 to HD10 at time t7. Herein, HD8, HD9, and HD10 satisfy a relationship of HD9=2×HD8=2×HD10. Note that, at time t6, the cycle of the readout horizontal synchronization signal is not changed. Further, the cycle HD6 of the horizontal synchronization signal, the cycle HD7 of the shutter horizontal synchronization signal, and the cycle HD8 of the readout horizontal synchronization signal satisfy a relationship of HD6=HD7=HD8.

The readout scan R8 is started from time t5. The shutter scan S8 corresponding to the readout scan R8 is started before time t5 so that the accumulation period is T8. The shutter operation on each row in the shutter scan S8 is performed based on the shutter horizontal synchronization signal as a reference. Herein, the cycle HD9 of the readout horizontal synchronization signal corresponding to the readout scan R8 is twice the cycle HD7 of the shutter horizontal synchronization signal. Thus, as depicted in FIG. 7, in the shutter scan S8, a shutter operation for one row is performed every time the shutter horizontal synchronization signals is input twice. Accordingly, the slope of the shutter scan S8 and the slope of the readout scan R8 become the same. Further, the slope of the shutter scan S8 does not change even if the cycle of the readout horizontal synchronization signal is changed from HD8 to HD9 at time t5, and the accumulation periods are even on all the rows. Thus, data read out by the readout scan R8 is effective data.

The readout scan R9 is started from time t6. The shutter scan S9 corresponding to the readout scan R9 is started before the time t6 so that the accumulation period is T9. Herein, the cycle HD9 of the readout horizontal synchronization signal corresponding to the readout scan R9 is twice the cycle HD7 of the shutter horizontal synchronization signal. Thus, as depicted in FIG. 7, in the shutter scan S9, a shutter operation for one row is performed every time the shutter horizontal synchronization signals is input twice in the same manner as in the shutter scan S8. Accordingly, the slope of the shutter scan S9 and the slope of the readout scan R9 become the same. Further, since the slope of the shutter scan S9 does not change at time t6, and the accumulation periods are even on all the rows. Thus, data read out by the readout scan R9 is effective data.

The readout scan R10 is started from time t7. The shutter scan S10 corresponding to the readout scan R10 is started before the time t7 so that the accumulation period is T10. Herein, the cycle HD10 of the readout horizontal synchronization signal corresponding to the readout scan R10 is the same as the cycle HD7 of the shutter horizontal synchronization signal. Thus, as depicted in FIG. 7, in the shutter scan S10, a shutter operation for one row is performed every time the shutter horizontal synchronization signals is input once. Accordingly, the slope of the shutter scan S10 and the slope of the readout scan R10 become the same. Further, since the slope of the shutter scan S10 does not change even if the cycle of the readout horizontal synchronization signal is changed from HD9 to HD10 at time t7, and the accumulation periods are even on all the rows. Thus, data read out by the readout scan R10 is effective data.

As described above, in the present drive method, a shutter scan and a readout scan are performed based on the shutter horizontal synchronization signal and the readout horizontal synchronization signal, respectively. Thus, the timing of a shutter operation can be set independently of the timing of a readout operation. Further, the frequency of shutter operations is defined in accordance with the ratio of cycles of the shutter horizontal synchronization signal and the readout horizontal synchronization signal, and thereby the constant accumulation periods on respective rows can be maintained.

The relationship between the ratio of the cycles of the shutter horizontal synchronization signal and the readout horizontal synchronization signal and the frequency of shutter operations will be described in a more generalized manner. The cycle of the horizontal synchronization signal input from the CPU 80 or the like is denoted as HD, the cycle of the readout horizontal synchronization signal is denoted as HDR, and the cycle of the shutter horizontal synchronization signal is denoted as HDS. Herein, respective cycles are set so that a relationship of HDR=n×HDS=n×HD (n is an integer greater than or equal to 1) is established. That is, the cycle of the readout horizontal synchronization signal is n times the cycle of the shutter horizontal synchronization signal and the horizontal synchronization signal. Furthermore, a shutter operation for one row is set to be performed every time n drive pulses of the shutter horizontal synchronization signal are input. With such a setting, a shutter scan and a readout scan have the same slope, and a scan that maintains constant accumulation periods on respective rows is thus realized.

Therefore, in the drive method of the present embodiment, a change of the drive mode which involves a change of the cycle of horizontal synchronization signal can be performed in the same manner as in the second comparative example and the third comparative example, and the cycle of a readout operation can be changed. That is, in the present embodiment, the imaging device 100 that enables switching to a drive mode with a different readout period when continuously acquiring a plurality of images is provided. Furthermore, in the present embodiment, since accumulation periods on respective rows can be the same even when the drive mode is changed, occurrence of ineffective data as described in the second comparative example can be avoided. Further, in the present embodiment, since the next shutter scan can be started before a readout scan ends even when the drive mode is changed, a delay of start of a readout scan and a reduction of the accumulation period T as described in the third comparative example can be avoided.

Figure 8:
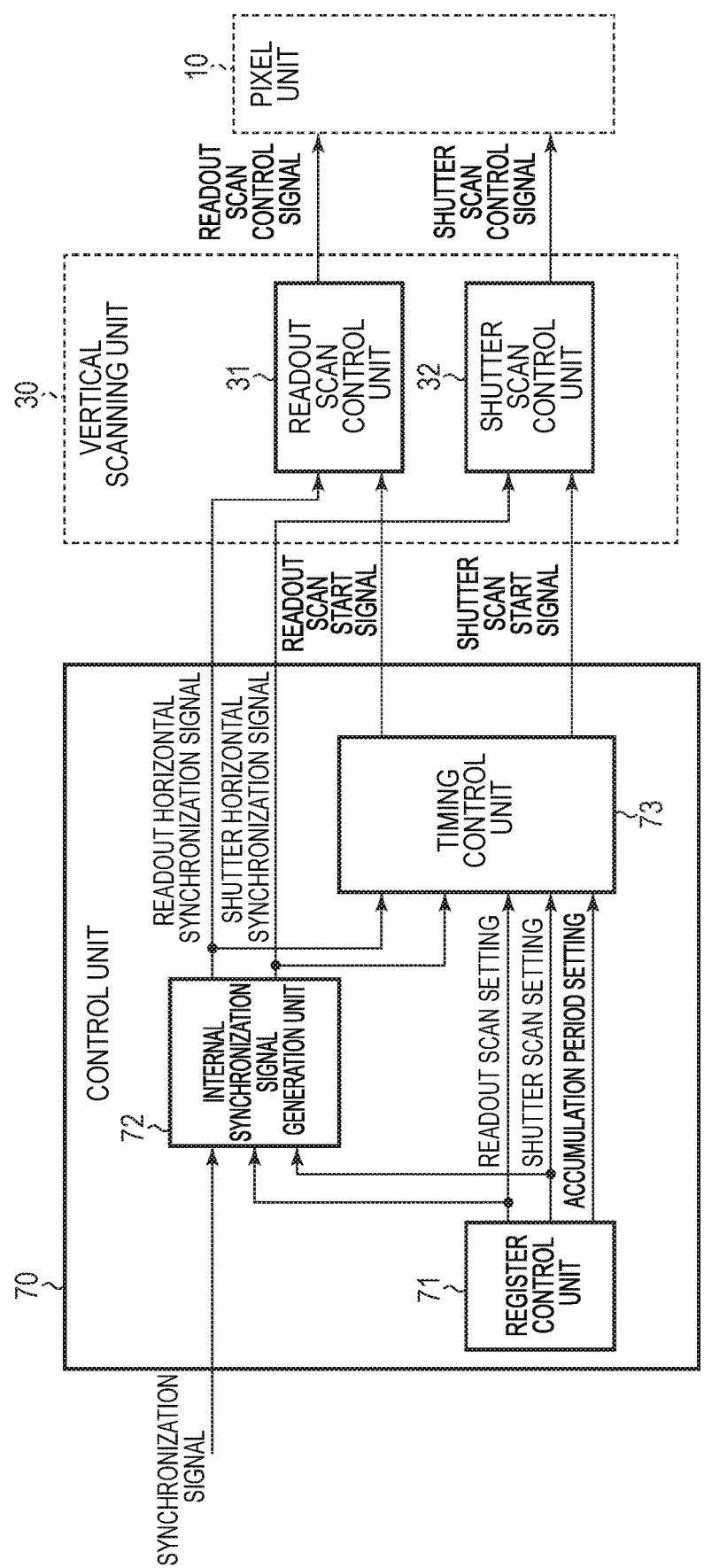
FIG. 8 is a block diagram illustrating a configuration example of a control unit and a vertical scanning unit according to the first embodiment.

FIG. 8 is a block diagram illustrating a configuration example of the control unit 70 and the vertical scanning unit 30 used for implementing the driving illustrated in FIG. 7. Note that the configuration of the control unit 70 and the vertical scanning unit 30 illustrated in FIG. 8 is an example and is not limited thereto.

The control unit 70 has a register control unit 71, an internal synchronization signal generation unit 72, and a timing control unit 73. The vertical scanning unit 30 has a readout scan control unit 31 and a shutter scan control unit 32.

The register control unit 71 holds information on settings related to a readout scan and a shutter scan (readout scan setting and shutter scan setting), a setting of accumulation periods corresponding to these scans (accumulation period setting), or the like. The register control unit 71 supplies the readout scan setting and the shutter scan setting to the internal synchronization signal generation unit 72 and the timing control unit 73 and supplies the accumulation period setting to the timing control unit 73.

The internal synchronization signal generation unit 72 generates a readout horizontal synchronization signal and a shutter horizontal synchronization signal from a synchronization signal (third synchronization signal) input from the inside or the outside of the imaging device 100 based on a readout scan setting and a shutter scan setting. Herein, as illustrated in FIG. 7, the cycle of the readout horizontal synchronization signal is the same as the cycle of the synchronization signal, and the cycle of the shutter horizontal synchronization signal is an integer multiple of the cycle of the synchronization signal. The internal synchronization signal generation unit 72 supplies the readout horizontal synchronization signal and the shutter horizontal synchronization signal to the timing control unit 73. Further, the internal synchronization signal generation unit 72 supplies the readout horizontal synchronization signal to the readout scan control unit 31 and the shutter horizontal synchronization signal to the shutter scan control unit 32.

The timing control unit 73 generates a readout scan start signal that is an instruction to start a readout scan and a shutter scan start signal that is an instruction to start a shutter scan based on input various settings, the readout horizontal synchronization signal, and the shutter horizontal synchronization signal. Herein, the time of a control pulse of the shutter scan start signal is generated at the time before the time of control pulse of the readout scan start signal so as to implement the accumulation period defined by an accumulation period setting for each readout.

The readout scan control unit 31 operates in response to receiving a readout horizontal synchronization signal and a readout scan start signal from the control unit 70. The readout scan control unit 31 selects a readout row every time a control pulse of the readout horizontal synchronization signal is input and outputs a readout scan control signal for the corresponding row to the pixel unit 10.

The shutter scan control unit 32 operates in response to receiving a shutter horizontal synchronization signal and a shutter scan start signal from the control unit 70 and outputs a shutter scan control signal to the pixel unit 10. The shutter scan control unit 32 selects a shutter row every time one control pulse of the shutter horizontal synchronization signal is input or every time a predetermined number of control pulses thereof are input and outputs a shutter scan control signal for the corresponding row to the pixel unit 10. Note that the readout scan control signal and the shutter scan control signal include the control signals PSEL, PRES, and PTX for the corresponding row.

The control unit 70 and the vertical scanning unit 30 are configured as described above, and thereby the driving illustrated in FIG. 7 can be realized.

As described above, according to the present embodiment, the imaging device 100 and a drive method of the imaging device 100 that enable switching to a drive mode with a different readout period when continuously acquiring a plurality of images are provided.

Note that, although the timing chart illustrated in FIG. 7 illustrates an example of the case where only one row is read out in one horizontal period, the embodiment is not limited thereto. By selecting a plurality of shutter rows and readout rows in a certain horizontal period and controlling the exposure periods on the plurality of selected rows to be constant, it is possible to collectively read out pixel signals from a plurality of rows in one horizontal period.

Further, the cycle of the synchronization signal input to the internal synchronization signal generation unit 72 in FIG. 8 may be set so as to match a readout cycle of a drive mode having the shortest cycle of various drive modes that can be switched. Accordingly, even with a drive mode by which the amount of data read out in one horizontal period is small, driving with a small loss of the readout period is realized.

Second Embodiment

A second embodiment will be described with reference to FIG. 9. The drive method of the imaging device 100 according to the present embodiment is configured so that a shutter scan performed in the second drive mode ends immediately after a readout scan performed in the first drive mode ends. With such a configuration as an example, a constraint condition when a readout scan performed in the first drive mode and a shutter scan performed in the second drive mode are performed in parallel will be described. Note that, in the description of the present embodiment, description of features common to the first embodiment may be omitted or simplified. In particular, since the device configuration of the present embodiment is the same as that of the first embodiment, the description thereof will be omitted.

Figure 9:
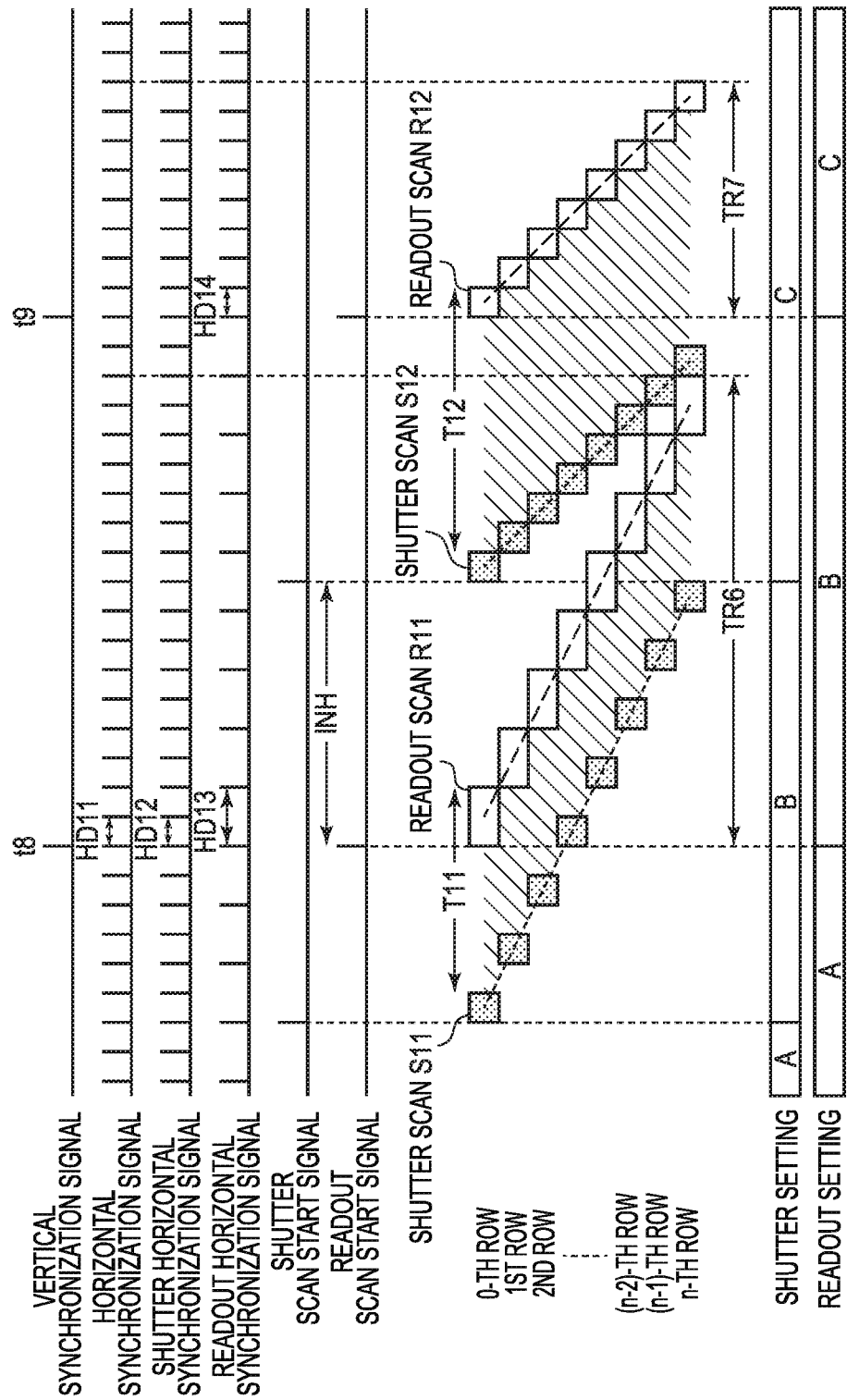
FIG. 9 is a timing chart illustrating a drive method of an imaging device according to a second embodiment.

FIG. 9 is a timing chart illustrating a drive method of the imaging device 100 according to the present embodiment. In FIG. 9, the shutter scan S11 and the readout scan R11 correspond to the first drive mode, and the shutter scan S12 and the readout scan R12 correspond to the second drive mode. The period length TR6 of the readout scan R11 of the first drive mode and the period length TR7 of the readout scan R12 of the second drive mode are different from each other.

FIG. 9 illustrates an example in which the cycle of the readout horizontal synchronization signal is changed from HD13 to HD14 at time t9. Herein, HD13 and HD14 satisfy a relationship of HD13=2×HD14 (that is, HD13>HD14). The cycle HD11 of the horizontal synchronization signal, the cycle HD12 of the shutter horizontal synchronization signal, and the cycle HD14 of the readout horizontal synchronization signal satisfy a relationship of HD11=HD12=HD14. Since TR6=HD13×(n+1) and TR7=HD14×(n+1) are met, a relationship of TR6=2×TR7 is established.

As illustrated in FIG. 9, the time interval between a control pulse of the readout scan start signal of the readout scan R11 and a control pulse of the readout scan start signal of the shutter scan S12 is denoted as INH. Herein, the condition for completing the shutter scan S12 immediately after the readout scan R11 as illustrated in FIG. 9 is INH=TR6−TR7+HD11 (alternatively, INH=TR6−TR7+HD12). With INH shorter than the above, the readout scan R11 would start earlier than the end of the shutter scan S12, a readout operation and a shutter operation would be performed at the same time on the same row, and therefore the readout scan R11 would not be performed normally. Therefore, if HD13>HD14, the readout scan R11 may be normally performed by setting the timing of each signal so as to meet INH≥TR6−TR7+HD11 (alternatively, INH≥TR6−TR7+HD12).

Note that, if HD13≤HD14 in contrast to FIG. 9, the readout scan R11 does not start earlier than the end of the shutter scan S12, and therefore the condition described above is not required. However, if a readout operation and a shutter operation were performed at the same time, the readout scan R11 would not be performed normally. Thus, the shutter scan S12 is required to be performed after completion of a readout operation of the 0-th row. That is, if HD13≤HD14, the readout scan R11 may be normally performed when the timing of each signal is set so as to meet INH≥HD13.

As described above, if HD13>HD14, the timing of each signal is set so as to meet INH≥TR6−TR7+HD11 (alternatively, INH≥TR6−TR7+HD12). Further, if HD13≤HD14, the timing of each signal is set so as to meet the condition of INH≥HD13. Accordingly, even when a readout scan and a shutter scan are performed in parallel, pixel signals can be read out normally.

Further, as illustrated in FIG. 9, if HD13>HD14, it is desirable to satisfy INH=TR6−TR7+HD11. Further, HD13≤HD14, it is desirable to satisfy INH=HD13. By setting the timings of respective signals in such a way, it is possible to minimize the idle period between a readout scan and a shutter scan.

Third Embodiment

A third embodiment will be described with reference to FIG. 10. The drive method of the imaging device 100 according to the present embodiment is configured so that a shutter scan performed in the second drive mode starts before a shutter scan performed in the first drive mode ends. Note that, in the description of the present embodiment, description of features common to the first embodiment or the second embodiment may be omitted or simplified. In particular, since the device configuration of the present embodiment is the same as that of the first embodiment or the second embodiment, the description thereof will be omitted.

Figure 10:
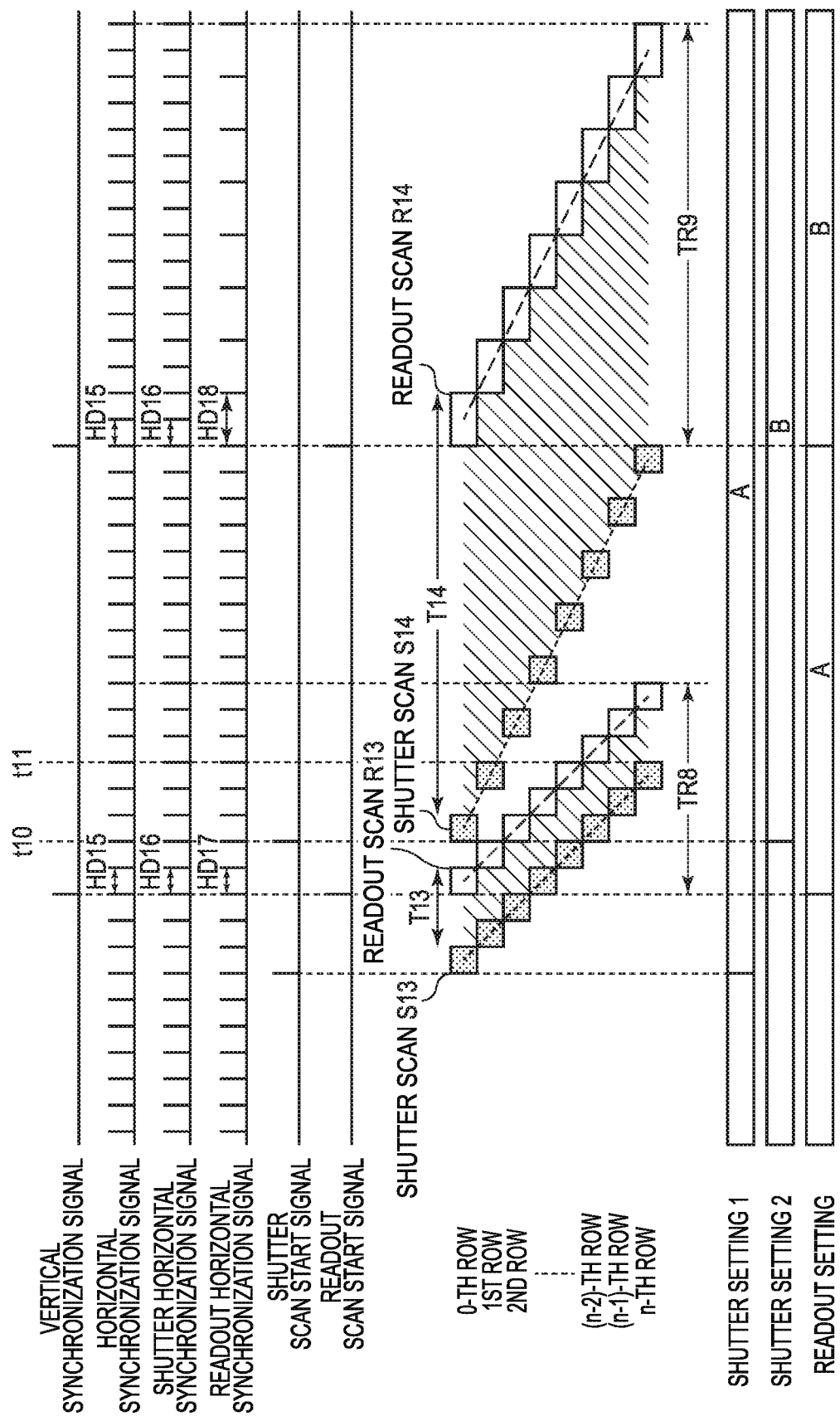
FIG. 10 is a timing chart illustrating a drive method of an imaging device according to a third embodiment.

FIG. 10 is a timing chart illustrating a drive method of the imaging device 100 according to the present embodiment. In FIG. 10, the shutter scan S13 and the readout scan R13 correspond to the first drive mode, and the shutter scan S14 and the readout scan R14 correspond to the second drive mode. The period length TR8 of the readout scan R13 of the first drive mode and the period length TR9 of the readout scan R14 of the second drive mode are different from each other. Further, in the present embodiment, a relationship of 2×HD17=HD18 is established between the cycle HD17 of the readout horizontal synchronization signal corresponding to the readout scan R13 and the cycle HD18 of the readout horizontal synchronization signal corresponding to the readout scan R14.

In FIG. 10, the shutter scan S14 starts at time t10 before time t11 when the shutter scan S13 ends. This can reduce the idle period between the readout scan R13 and the shutter scan S14.

Herein, two shutter scans S13 and S14 are performed in parallel in the period from time t10 to time t11. Since the shutter scan S13 and the shutter scan S14 are performed in different drive modes, different settings are required for these scans. Accordingly, as illustrated in "shutter setting 1" and "shutter setting 2" of FIG. 10, the register control unit 71 of the imaging device 100 is configured to be able to set a plurality of conditions for shutter scans at the same time, and thereby driving of the present embodiment can be realized.

According to the present embodiment, because a shutter scan performed in the second drive mode starts before a shutter scan performed in the first drive mode ends, and this can reduce the idle period between the readout scan and the shutter scan.

Fourth Embodiment

A fourth embodiment will be described with reference to FIG. 11 to FIG. 14B. In the present embodiment, an example in which the scheme of switching between the first drive mode and the second drive mode of the first to third embodiments is applied to a pixel configuration that can acquire a focus detection signal will be described. The imaging device 100 of the present embodiment is different from the first to third embodiments in that each single pixel P has a plurality of photoelectric conversion units and the pixel P can output a focus detection signal and an imaging signal. Note that, in the description of the present embodiment, description of features common to the first to third embodiment may be omitted or simplified.

Figure 11:
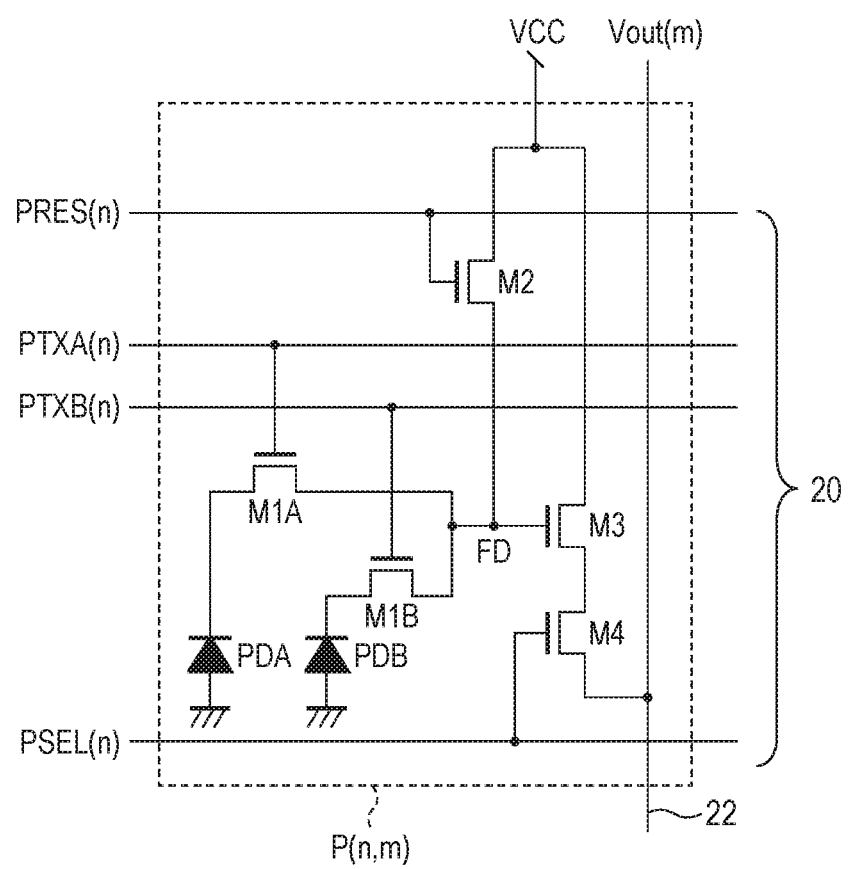
FIG. 11 is a circuit diagram illustrating a configuration example of a pixel in an imaging device according to a fourth embodiment.

FIG. 11 is a circuit diagram illustrating a configuration example of the pixel P according to the present embodiment. The pixel P includes two photoelectric conversion units PDA and PDB (first photoelectric conversion unit, second photoelectric conversion unit), two transfer transistors M1A and M1B, the FD reset transistor M2, the amplifier transistor M3, and the select transistor M4.

The anodes of photodiodes forming the photoelectric conversion units PDA and PDB are connected to the ground node. The cathode of the photodiode forming the photoelectric conversion unit PDA is connected to the source of the transfer transistor M1A. The cathode of the photodiode forming the photoelectric conversion unit PDB is connected to the source of the transfer transistor M1B. The drains of the transfer transistors M1A and M1B are connected to the source of the FD reset transistor M2 and the gate of the amplifier transistor M3.

In the present embodiment, two transfer gate signal lines are connected to the gates of the transfer transistors M1A and M1B of the pixels P belonging to a corresponding row, respectively. The two transfer gate signal lines supply control signals PTXA and PTXB, which are supplied from the vertical scanning unit 30, to the gates of the transfer transistors M1A and M1B, respectively.

Figure 12:
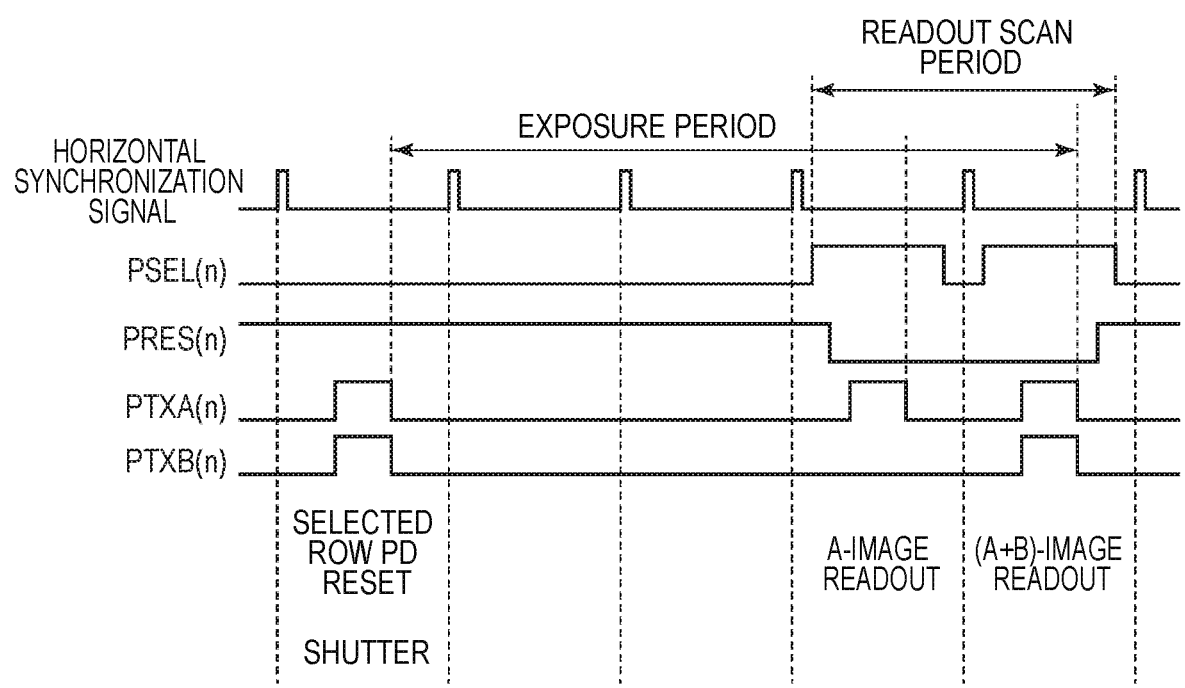
FIG. 12 is a timing chart illustrating a drive method of the imaging device according to the fourth embodiment.
Figure 13:
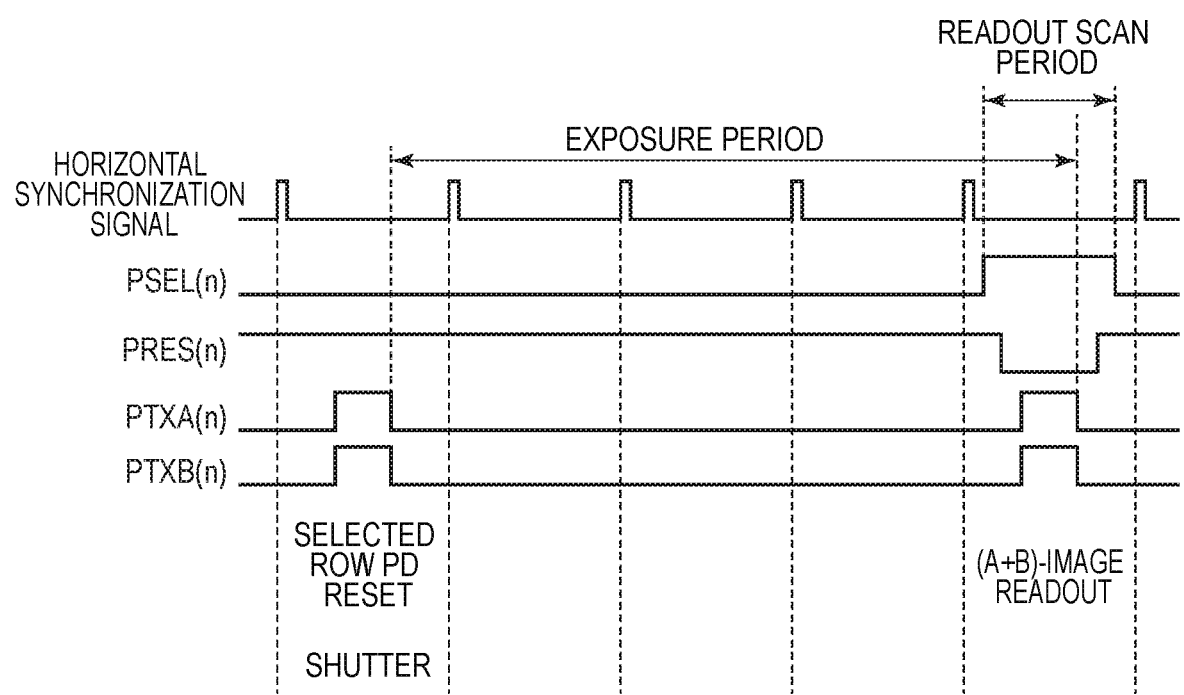
FIG. 13 is a timing chart illustrating a drive method of the imaging device according to the fourth embodiment.

FIG. 12 is a timing chart illustrating a drive method performed in a first drive mode of the imaging device 100 according to the present embodiment, and FIG. 13 is a timing chart illustrating a drive method performed in a second drive mode of the imaging device 100 according to the present embodiment. FIG. 12 and FIG. 13 illustrate outlines of the shutter operation and the readout operation on each row of the pixel unit 10. Note that FIG. 12 and FIG. 13 each illustrate only the operation on the n-th row.

First, the drive method performed in the first drive mode will be described with reference to FIG. 12. The first drive mode is a drive mode to continuously perform readout of a pixel signal (A-image) based on only the charges generated by one photoelectric conversion unit PDA and a pixel signal ((A+B)-image) based on charges generated by both the photoelectric conversion unit PDA and the photoelectric conversion unit PDB. Since the shutter operation is substantially the same as that of FIG. 3, the description thereof will be omitted.

In a readout operation of an A-image, the control signal PRES(n) is controlled to the low level, the control signals PSEL(n) and PTXA(n) are controlled to the high level, and with the FD reset transistor M2 being in the off-state, the transfer transistor M1A and the select transistor M4 are turned on at the same time. Thereby, charges accumulated in the photoelectric conversion unit PDA are transferred to the floating diffusion FD. The amplifier transistor M3 outputs a pixel signal of the A-image in accordance with the potential of the floating diffusion FD to the output line 22 via the select transistor M4. In such a way, the A-image based on charges generated by the photoelectric conversion unit PDA is read out.

After the readout operation of the A-image, a readout operation of an (A+B)-image is performed. In the readout operation of the (A+B)-image, the control signal PRES(n) is controlled to the low level, and the control signals PSEL(n), PTXA(n), and PTXB(n) are controlled to the high level. Thus, with the FD reset transistor M2 being in the off-state, the transfer transistors M1A and M1B and the select transistor M4 are turned on at the same time. Thereby, charges accumulated in the photoelectric conversion unit PDA and charges accumulated in the photoelectric conversion unit PDB are transferred to the floating diffusion FD. The amplifier transistor M3 outputs a pixel signal of the (A+B)-image in accordance with the potential of the floating diffusion FD to the output line 22 via the select transistor M4. In such a way, the (A+B)-image based on charges generated by the photoelectric conversion units PDA and PDB is read out.

By subtracting the pixel signal of the A-image from the pixel signal of the (A+B)-image, it is possible to obtain a pixel signal (B-image) based on charges generated by the photoelectric conversion unit PDB. The pixel signal of the A-image and the pixel signal of the B-image obtained in such a way may be used for focus detection or the like. Further, the pixel signal of the (A+B)-image may be used for generation of an image. In a camera, a focusing operation is performed based on a result of focus detection.

Next, the drive method performed in the second drive mode will be described with reference to FIG. 13. The second drive mode is a drive mode to read out only the pixel signal of the (A+B)-image. In this drive mode, a readout operation of the A-image is omitted from the first drive mode illustrated in FIG. 12. Since other features are substantially the same as those of FIG. 12, the description thereof will be omitted.

In the second drive mode, although it is not possible to obtain a pair of pixel signals of the A-image and the B-image, it is possible to reduce the time required for readout compared to the first drive mode. The difference in the readout period will be described with reference to FIG. 14A and FIG. 14B.

FIG. 14A is a diagram schematically illustrating the time required for a readout operation performed in the first drive mode. As illustrated in FIG. 14A, in the readout operation performed in the first drive mode, three times of AD conversion, namely, N-conversion, A-conversion, and (A+B)-conversion are performed in a period Ta that is one cycle of the horizontal synchronization signal. Note that, since the majority of the time required for a readout operation is the period for AD conversion, only the period of AD conversion is considered here. Each triangle in the field of "AD CONVERSION" of FIG. 14A schematically illustrates a change in the potential of a ramp signal used for AD conversion. Herein, the N-conversion means AD conversion of a signal indicating the potential of the floating diffusion FD in a reset state. Further, the A-conversion and the (A+B)-conversion mean AD conversion of a pixel signal of the A-image and AD conversion of a pixel signal of the (A+B)-image, respectively. Readout operations for n+1 rows are performed in one cycle (frame period) of the vertical synchronization signal. Therefore, the length of one cycle of the vertical synchronization signal is required to be at least longer than Ta×(n+1).

FIG. 14B is a diagram schematically illustrating the time required for a readout operation performed in the second drive mode. As illustrated in FIG. 14B, in the readout operation performed in the second drive mode, two times of AD conversion, namely, N-conversion and (A+B)-conversion are performed in a period Tb that is one cycle of the horizontal synchronization signal. Herein, the length of one cycle of the vertical synchronization signal is at least longer than Tb×(n+1). In the second drive mode, since the number of times of AD conversion performed within one cycle of the horizontal synchronization signal is small, Tb<Ta can be established, and the time required for readout can be reduced compared to the first drive mode.

As described above, in the first drive mode, while a pair of pixel signals of the A-image and the B-image are obtained, the time required for readout is long. In contrast, in the second drive mode, while a pair of pixel signals of the A-image and the B-image are not obtained, the time required for readout is short. Since a pair of the pixel signals of the A-image and the B-image are signals used for focus detection, acquisition of both the signals may not be required to be performed in every frame.

Accordingly, in the present embodiment, the first drive mode and the second drive mode are switched in accordance with a frame by using the scheme of the first to third embodiments. Thus, an overall readout period can be reduced compared to the case of always using the first drive mode.

Fifth Embodiment

Figure 15:
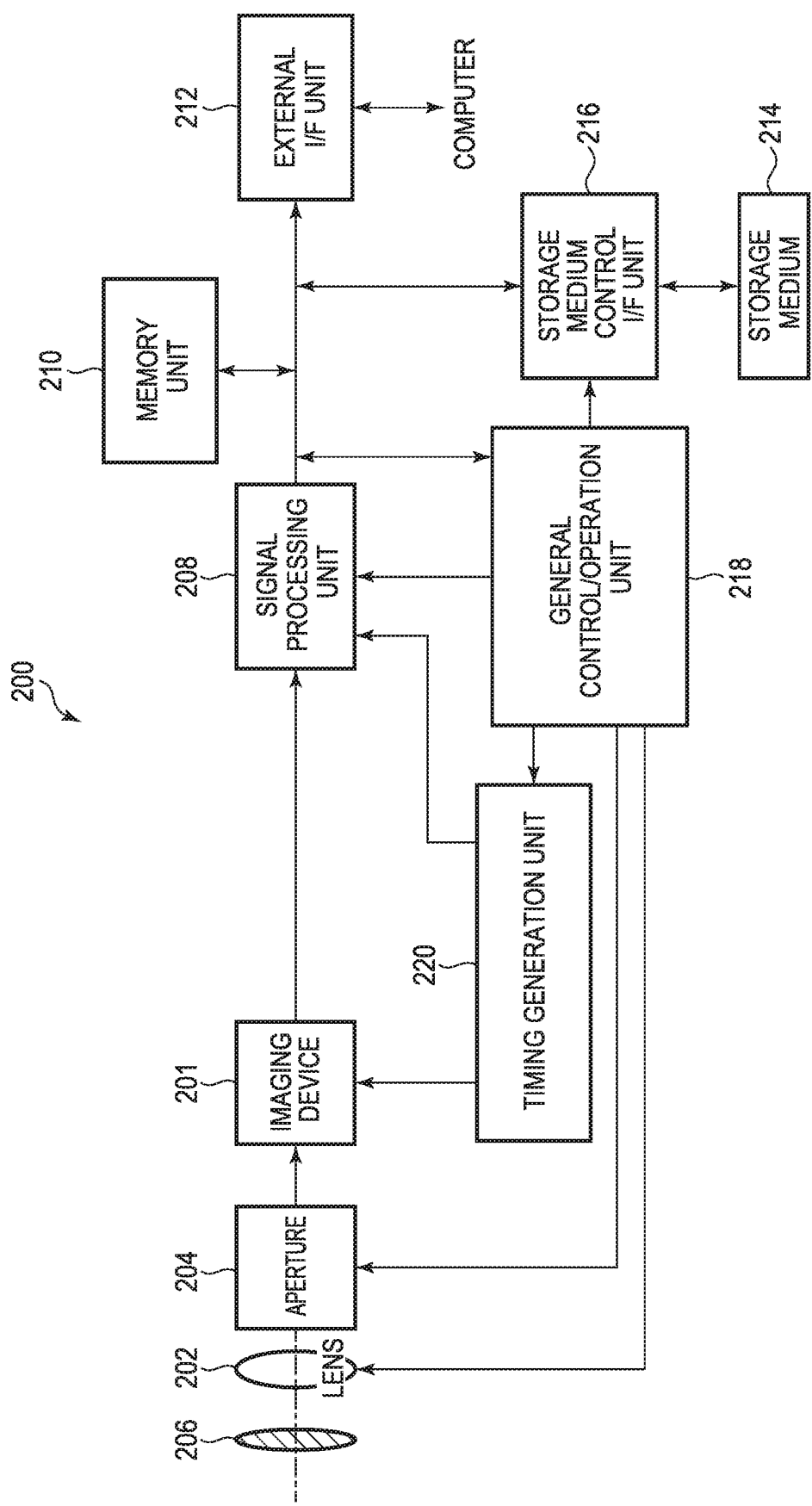
FIG. 15 is a block diagram illustrating a general configuration of an imaging system according to a fifth embodiment.

An imaging system according to a fifth embodiment of the present invention will be described with reference to FIG. 15. FIG. 15 is a block diagram illustrating a general configuration of the imaging system according to the present embodiment.

The imaging device 100 described in the first to fourth embodiments described above can be applied to various imaging systems. Examples of applicable imaging systems may include a digital still camera, a digital camcorder, a surveillance camera, a copying machine, a fax machine, a mobile phone, an on-vehicle camera, an observation satellite, and the like. In addition, a camera module including an optical system such as a lens and an imaging device is also included in the imaging system. FIG. 15 illustrates a block diagram of a digital still camera as an example out of these examples. An apparatus having various imaging systems may be an electronic apparatus, an information apparatus, a communication apparatus, a medical apparatus, an industrial apparatus, an analysis apparatus, a transportation apparatus, or the like.

An imaging system 200 illustrated as an example in FIG. 15 has an imaging device 201, a lens 202 that captures an optical image of a subject onto the imaging device 201, an aperture 204 for changing a light amount passing through the lens 202, and a bather 206 for protecting the lens 202. The lens 202 and the aperture 204 form an optical system that converges a light onto the imaging device 201. The imaging device 201 is any of the imaging devices 100 described in the first to fourth embodiments and converts an optical image captured by the lens 202 into image data.

Further, the imaging system 200 has a signal processing unit 208 that processes an output signal output from the imaging device 201. The signal processing unit 208 performs AD conversion to convert an analog signal output from the imaging device 201 into a digital signal. In addition, the signal processing unit 208 performs operations of performing various correction or compression to output image data, if necessary. The AD conversion unit that is a part of the signal processing unit 208 may be formed on a semiconductor substrate on which the imaging device 201 is provided or formed on a semiconductor substrate separately from the imaging device 201. Further, the imaging device 201 and the signal processing unit 208 may be formed on the same semiconductor substrate.

Furthermore, the imaging system 200 has a memory unit 210 for temporarily storing image data therein and an external interface unit (external I/F unit) 212 for communicating with an external computer or the like. The imaging system 200 further has a storage medium 214 such as a semiconductor memory for performing storage or readout of imaging data and a storage medium control interface unit (storage medium control I/F unit) 216 for performing storage or readout on the storage medium 214. Note that the storage medium 214 may be embedded in the imaging system 200 or may be removable.

Furthermore, the imaging system 200 has a general control/operation unit 218 that performs various calculation and controls the entire digital still camera and a timing generation unit 220 that outputs various timing signals to the imaging device 201 and the signal processing unit 208. Here, the timing signal or the like may be input from the outside, and the imaging system 200 may have at least the imaging device 201 and the signal processing unit 208 that processes an output signal output from the imaging device 201. The apparatus having the imaging system 200 may have a mechanical device such as a motor, an actuator, or the like. The general control/operation unit 218 may be a control device that controls the mechanical device in accordance with information based on a signal from the imaging device 201. The mechanical device moves the lens 202 for focusing or vibration isolation (blur correction), operates the aperture 204, or moves the imaging device 301 for vibration isolation. Information used for controlling these mechanical devices may be based on a signal obtained from the imaging device 201.

The imaging device 201 outputs an imaging signal to the signal processing unit 208. The signal processing unit 208 performs predetermined signal processing on an imaging signal output from the imaging device 201 and outputs image data. The signal processing unit 208 uses an imaging signal to generate an image.

By applying the imaging device 100 according to the first to fourth embodiments, it is possible to realize an imaging system that enables switching of the drive mode.

Sixth Embodiment

Figure 16A:
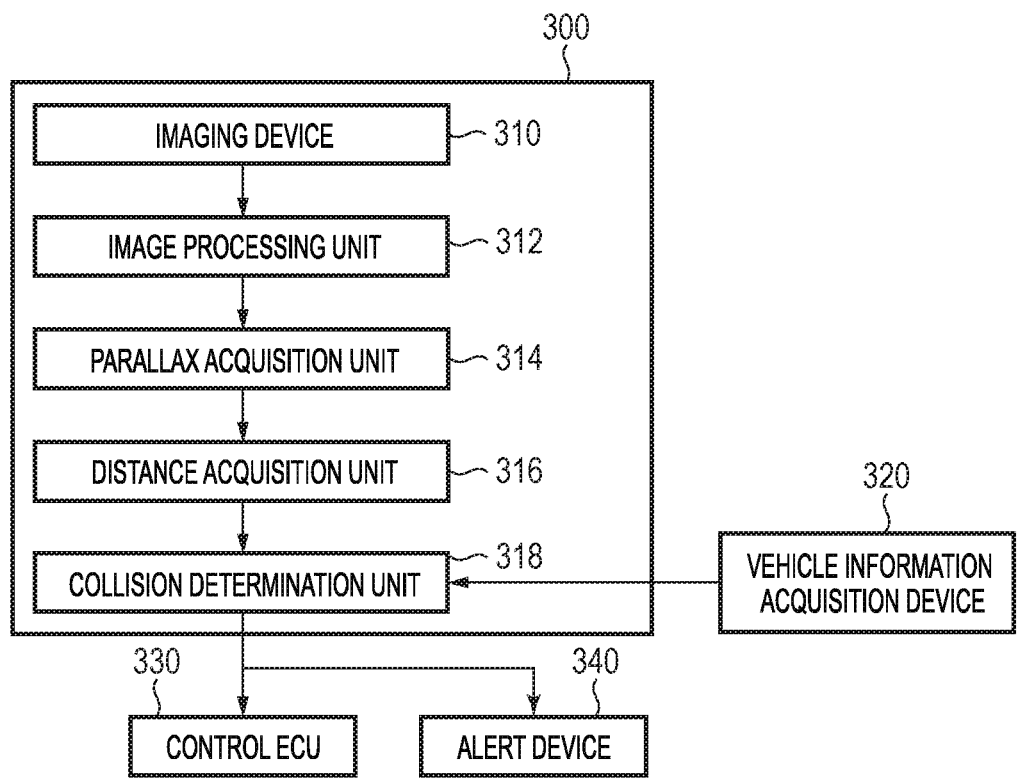
FIG. 16A and FIG. 16B are diagrams illustrating a configuration example of an imaging system and an apparatus according to a sixth embodiment.
Figure 16B:
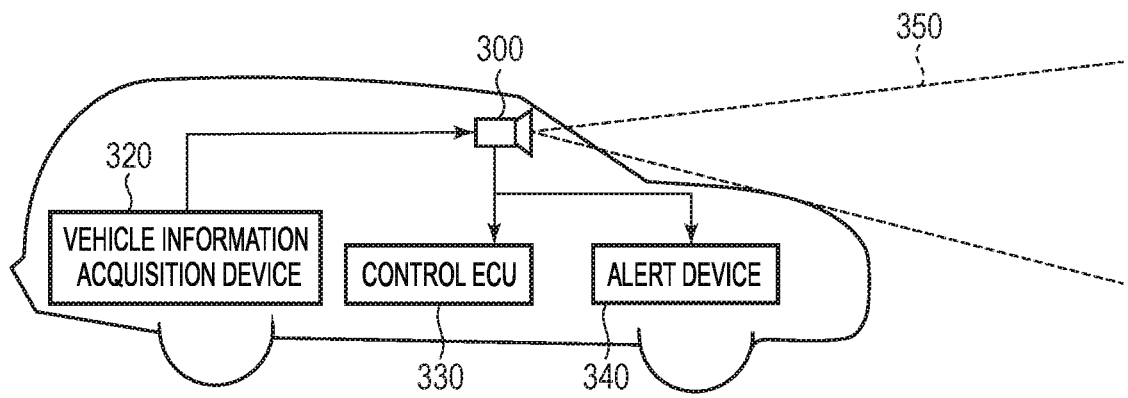

An imaging system and a moving body (transportation apparatus) according to a sixth embodiment of the present invention will be described with reference to FIG. 16A and FIG. 16B. FIG. 16A and FIG. 16B are diagrams illustrating the configuration of the imaging system and the apparatus (transportation apparatus, moving body) according to the present embodiment.

FIG. 16A illustrates an example of an imaging system related to an on-vehicle camera. An imaging system 300 has an imaging device 310. The imaging device 310 is the imaging device 100 described above in any of the first to fourth embodiments. The imaging system 300 has an image processing unit 312 that performs image processing on a plurality of image data acquired by the imaging device 310 and a parallax acquisition unit 314 that calculates a parallax (a phase difference of parallax images) from the plurality of image data acquired by the imaging system 300. Further, the imaging system 300 has a distance acquisition unit 316 that calculates a distance to the object based on the calculated parallax and a collision determination unit 318 that determines whether or not there is a collision possibility based on the calculated distance. Here, the parallax acquisition unit 314 and the distance acquisition unit 316 are an example of a distance information acquisition unit that acquires distance information on the distance to the object. That is, the distance information is information on a parallax, a defocus amount, a distance to an object, or the like. The collision determination unit 318 may use any of the distance information to determine the collision possibility. The distance information acquisition unit may be implemented by dedicatedly designed hardware or may be implemented by a software module. Further, the distance information acquisition unit may be implemented by a field programmable gate array (FPGA), an application specific integrated circuit (ASIC), or the like or may be implemented by a combination thereof.

The imaging system 300 is connected to the vehicle information acquisition device 320 and can acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. Further, the imaging system 300 is also connected to an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like. The mechanical device such as a brake, an engine, or the like is controlled by a control device such as the control ECU 330 in accordance with information based on a signal from the imaging device 310.

In the present embodiment, an area around a vehicle, for example, a front area or a rear area is captured by using the imaging system 300. FIG. 16B illustrates the imaging system when a front area of a vehicle (a capturing area 350) is captured. The vehicle information acquisition device 320 transmits an instruction to the imaging system 300 or the imaging device 310. Such a configuration can further improve the ranging accuracy.

Although the example of control for avoiding a collision to another vehicle has been described, the embodiment is applicable to automatic driving control for following another vehicle, automatic driving control for not going out of a traffic lane, or the like. Furthermore, the imaging system is not limited to a vehicle such as the subject vehicle and can be applied to a moving body (transportation apparatus) such as a ship, an airplane, or an industrial robot, for example. In addition, the imaging system can be widely applied to a device which utilizes object recognition, such as an intelligent transportation system (ITS), without being limited to moving bodies.

Modified Embodiments

The present invention is not limited to the embodiments described above, and various modifications are possible.

For example, a form in which a part of the configuration of any of the embodiments is added to another embodiment or a form in which a part of the configuration of any of the embodiments is replaced with a part of the configuration of another embodiment is also one of the embodiments of the present invention.

Further, the imaging systems illustrated in the above embodiments are examples of an imaging system to which the imaging device 100 of the present invention may be applied, and an imaging system to which the imaging device 100 of the present invention can be applied is not limited to the configuration illustrated in FIG. 15, FIG. 16A, and FIG. 16B.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-155804, filed Aug. 28, 2019, which is hereby incorporated by reference herein in its entirety.

What is claimed is:

1. An imaging device comprising:
   a plurality of pixels arranged over a plurality of rows, wherein each of the plurality of pixels includes a photoelectric conversion unit configured to generate and accumulate charges by photoelectric conversion, a detection unit to which charges are transferred from the photoelectric conversion unit, an amplifier unit that is connected to the detection unit and configured to output a pixel signal in accordance with a potential of the detection unit, and a reset unit configured to reset charges accumulated in the photoelectric conversion unit;
   a scanning unit configured to control the plurality of pixels so as to perform a shutter scan to start accumulation of charges in the photoelectric conversion unit by releasing reset of the photoelectric conversion unit for each of the rows and perform a readout scan to output the pixel signal from the amplifier unit to a signal line for each of the rows; and
   a control unit configured to output, to the scanning unit, a first synchronization signal indicating a drive timing of pixels on respective rows in the shutter scan and a second synchronization signal indicating a drive timing of pixels on respective rows in the readout scan,
   wherein the first synchronization signal includes control pulses of a first cycle, and an interval of the control pulses of the first synchronization signal defines a length of a period of a shutter operation for one row,
   wherein the second synchronization signal includes control pulses of a second cycle different from the first cycle, and an interval of the control pulses of the second synchronization signal defines a length of a period of a readout operation for one row, and
   wherein the scanning unit is further configured to:
   switch a drive mode between a first drive mode and a second drive mode in control of the plurality of pixels based on the first synchronization signal and the second synchronization signal, the first drive mode and the second drive mode having periods of different lengths of the readout operation for one row, and
   start the shutter scan performed in the second drive mode before the readout scan performed in the first drive mode ends when switching a drive mode from the first drive mode to the second drive mode.

2. The imaging device according to claim 1, wherein the scanning unit is further configured to perform driving of pixels on respective rows at a cycle different from the first cycle of the control pulses included in the first synchronization signal in the shutter scan.

3. The imaging device according to claim 1, wherein the second cycle of the control pulses included in the second synchronization signal changes in accordance with a drive mode.

4. The imaging device according to claim 1, wherein the second cycle of the control pulses included in the second synchronization signal is n times the first cycle of the control pulses included in the first synchronization signal, where n is an integer greater than or equal to 1.

5. The imaging device according to claim 4, wherein the scanning unit is further configured to perform driving of pixels on respective rows at a cycle that is n times the first cycle of the control pulses included in the first synchronization signal in the shutter scan.

6. The imaging device according to claim 5, wherein the scanning unit is further configured to perform driving of a pixel on one row every time n control pulses are input in the shutter scan.

7. The imaging device according to claim 1, wherein the control unit generates the control pulses of the first synchronization signal and the second synchronization signal based on control pulses included in a third synchronization signal input to the control unit.

8. The imaging device according to claim 7, wherein the first cycle of the control pulses included in the first synchronization signal is the same as a cycle of the control pulses included in the third synchronization signal.

9. The imaging device according to claim 1, wherein if HD13>HD14, INH≥TR6−TR7+HD12 is satisfied, where INH denotes a length of a period from start of the readout scan performed in the first drive mode to start of the shutter scan performed in the second drive mode, TR6 denotes a length of a period of the readout scan performed in the first drive mode, TR7 denotes a length of a period of the readout scan performed in the second drive mode, HD12 denotes a cycle of the control pulses included in the first synchronization signal, HD13 denotes a cycle of the control pulses included in the second synchronization signal in the first drive mode, and HD14 denotes a cycle of the control pulses included in the second synchronization signal in the second drive mode.

10. The imaging device according to claim 9, wherein if HD13>HD14, INH=TR6−TR7+HD12 is satisfied.

11. The imaging device according to claim 9, wherein if HD13≤HD14, INH≥HD13 is satisfied.

12. An imaging device comprising:
   a plurality of pixels arranged over a plurality of rows, wherein each of the plurality of pixels includes a photoelectric conversion unit configured to generate and accumulate charges by photoelectric conversion, a detection unit to which charges are transferred from the photoelectric conversion unit, an amplifier unit that is connected to the detection unit and configured to output a pixel signal in accordance with a potential of the detection unit, and a reset unit configured to reset charges accumulated in the photoelectric conversion unit;
   a scanning unit configured to control the plurality of pixels so as to perform a shutter scan to start accumulation of charges in the photoelectric conversion unit by releasing reset of the photoelectric conversion unit for each of the rows and perform a readout scan to output the pixel signal from the amplifier unit to a signal line for each of the rows; and
   a control unit configured to output, to the scanning unit, a first synchronization signal indicating a drive timing of pixels on respective rows in the shutter scan and a second synchronization signal indicating a drive timing of pixels on respective rows in the readout scan,
   wherein the scanning unit is further configured to:
   switch a drive mode between a first drive mode and a second drive mode having periods of different lengths of the readout scan in control of the plurality of pixels based on the first synchronization signal and the second synchronization signal, and start the shutter scan performed in the second drive mode before the readout scan performed in the first drive mode ends when switching a drive mode from the first drive mode to the second drive mode wherein the first synchronization signal and the second synchronization signal include control pulses having cycles different from each other, wherein the control unit generates control pulses of the first synchronization signal and the second synchronization signal based on control pulses included in a third synchronization signal input to the control unit, and wherein a cycle of control pulses included in the second synchronization signal is n times a cycle of control pulses included in the third synchronization signal, where n is an integer greater than or equal to 1.

13. An imaging device comprising:

a plurality of pixels arranged over a plurality of rows, wherein each of the plurality of pixels includes a photoelectric conversion unit configured to generate and accumulate charges by photoelectric conversion, a detection unit to which charges are transferred from the photoelectric conversion unit, an amplifier unit that is connected to the detection unit and configured to output a pixel signal in accordance with a potential of the detection unit, and a reset unit configured to reset charges accumulated in the photoelectric conversion unit;

a scanning unit configured to control the plurality of pixels so as to perform a shutter scan to start accumulation of charges in the photoelectric conversion unit by releasing reset of the photoelectric conversion unit for each of the rows and perform a readout scan to output the pixel signal from the amplifier unit to a signal line for each of the rows; and a control unit configured to output, to the scanning unit, a first synchronization signal indicating a drive timing of pixels on respective rows in the shutter scan and a second synchronization signal indicating a drive timing of pixels on respective rows in the readout scan, wherein the scanning unit is further configured to:
  switch a drive mode between a first drive mode and a second drive mode having periods of different lengths of the readout scan in control of the plurality of pixels based on the first synchronization signal and the second synchronization signal, and
  start the shutter scan performed in the second drive mode before the readout scan performed in the first drive mode ends when switching a drive mode from the first drive mode to the second drive mode, and wherein the scanning unit is further configured to start the shutter scan performed in the second drive mode before the shutter scan performed in the first drive mode ends when switching a drive mode from the first drive mode to the second drive mode.

14. The imaging device according to claim 13, wherein the control unit is further configured to set a plurality of conditions for the shutter scan at the same time.

15. An imaging device comprising:

a plurality of pixels arranged over a plurality of rows, wherein each of the plurality of pixels includes a photoelectric conversion unit configured to generate and accumulate charges by photoelectric conversion, a detection unit to which charges are transferred from the photoelectric conversion unit, an amplifier unit that is connected to the detection unit and configured to output a pixel signal in accordance with a potential of the detection unit, and a reset unit configured to reset charges accumulated in the photoelectric conversion unit;

a scanning unit configured to control the plurality of pixels so as to perform a shutter scan to start accumulation of charges in the photoelectric conversion unit by releasing reset of the photoelectric conversion unit for each of the rows and perform a readout scan to output the pixel signal from the amplifier unit to a signal line for each of the rows; and a control unit configured to output, to the scanning unit, a first synchronization signal indicating a drive timing of pixels on respective rows in the shutter scan and a second synchronization signal indicating a drive timing of pixels on respective rows in the readout scan, wherein the scanning unit is further configured to:
  switch a drive mode between a first drive mode and a second drive mode having periods of different lengths of the readout scan in control of the plurality of pixels based on the first synchronization signal and the second synchronization signal, and
  start the shutter scan performed in the second drive mode before the readout scan performed in the first drive mode ends when switching a drive mode from the first drive mode to the second drive mode, wherein each of the plurality of pixels includes a first photoelectric conversion unit and a second photoelectric conversion unit, wherein the first drive mode is a mode to output a pixel signal based on only one of the first photoelectric conversion unit and the second photoelectric conversion unit and a pixel signal based on both of the first photoelectric conversion unit and the second photoelectric conversion unit, and wherein the second drive mode is a mode to output a pixel signal based on both of the first photoelectric conversion unit and the second photoelectric conversion unit without outputting a pixel signal based on only one of the first photoelectric conversion unit and the second photoelectric conversion unit.

16. An imaging system comprising:
the imaging device according to claim 1; and
a signal processing unit configured to process signals output from the pixels of the imaging device.

17. An apparatus comprising:
the imaging device according to claim 1;
a mechanical device; and
a control device configured to control the mechanical device in accordance with information based on a signal from the imaging device.

18. A drive method of an imaging device having:
a plurality of pixels arranged over a plurality of rows, wherein each of the plurality of pixels includes a photoelectric conversion unit configured to generate and accumulate charges by photoelectric conversion, a detection unit to which charges are transferred from the photoelectric conversion unit, an amplifier unit that is connected to the detection unit and configured to output a pixel signal in accordance with a potential of the detection unit, and a reset unit configured to reset charges accumulated in the photoelectric conversion unit, a scanning unit configured to control the plurality of pixels so as to perform a shutter scan to start accumulation of charges in the photoelectric conversion unit by releasing reset of the photoelectric conversion unit for each of the rows and perform a readout scan to output the pixel signal from the amplifier unit to a signal line for each of the rows, and a control unit configured to output, to the scanning unit, a first synchronization signal indicating a drive timing of pixels on respective rows in the shutter scan and a second synchronization signal indicating a drive timing of pixels on respective rows in the readout scan, the drive method comprising:

controlling the plurality of pixels by using a first drive mode based on the first synchronization signal and the second synchronization signal;

based on the first synchronization signal and the second synchronization signal, controlling the plurality of pixels by using a second drive mode that is different from the first drive mode in a length of a period of a readout operation for one row; and starting the shutter scan performed in the second drive mode before the readout scan performed in the first drive mode ends;

wherein the first synchronization signal includes control pulses of a first cycle, and an interval of the control pulses of the first synchronization signal defines a length of a period of a shutter operation for one row, and wherein the second synchronization signal includes control pulses of a second cycle different from the first cycle, and an interval of the control pulses of the second synchronization signal defines a length of a period of the readout operation for one row.

* * * * *